(12) United States Patent
Kasai et al.

(10) Patent No.: US 7,466,568 B2
(45) Date of Patent: Dec. 16, 2008

(54) SWITCHING POWER SUPPLY CIRCUIT

(75) Inventors: Joji Kasai, Neyagawa (JP); Tadashi Yamamoto, Neyagawa (JP); Koji Takatori, Okayama (JP)

(73) Assignee: Onkyo Corporation, Neyagawa (JP)

( * ) Notice: Subject to any disclaimer, the term of this patent is extended or adjusted under 35 U.S.C. 154(b) by 371 days.

(21) Appl. No.: 11/372,905

(22) Filed: Mar. 10, 2006

(65) Prior Publication Data

US 2007/0019444 A1    Jan. 25, 2007

(30) Foreign Application Priority Data

Jul. 22, 2005   (JP)   ............... 2005-212412
Feb. 2, 2006    (JP)   ............... 2006-025416

(51) Int. Cl.
   *H02M 3/335*   (2006.01)
(52) U.S. Cl. ........................... 363/19; 363/49
(58) Field of Classification Search ............ 363/16, 363/18, 19, 22, 23, 49
   See application file for complete search history.

(56) References Cited

U.S. PATENT DOCUMENTS

| | | | |
|---|---|---|---|
| 6,469,913 B2* | 10/2002 | Hosotani et al. | 363/16 |
| 6,509,784 B2* | 1/2003 | Seinen et al. | 327/530 |
| 6,898,090 B2* | 5/2005 | Nishida et al. | 363/19 |
| 6,912,140 B2 | 6/2005 | Kasai et al. | |
| 7,012,816 B2* | 3/2006 | Amei | 363/19 |

FOREIGN PATENT DOCUMENTS

| | | |
|---|---|---|
| JP | 52-121609 | 9/1977 |
| JP | 52-121610 | 9/1977 |
| JP | 59-44183 | 3/1984 |
| JP | 64-40283 | 3/1989 |
| JP | 64-40284 | 3/1989 |
| JP | 3-21984 | 3/1991 |
| JP | 2003-061343 | 2/2003 |

* cited by examiner

*Primary Examiner*—Matthew V Nguyen
(74) *Attorney, Agent, or Firm*—Renner, Otto, Boisselle & Sklar, LLP

(57) ABSTRACT

A switching power supply circuit of the present invention includes: a transformer including a main winding and an auxiliary winding, which are magnetically coupled together on a primary winding side; a switching element for intermittently supplying a direct-current voltage to the main winding; and a controller for turning ON/OFF the switching element using a voltage induced across the auxiliary winding by the intermittent supply of the direct-current voltage. The switching power supply circuit includes a startup circuit, the startup circuit including: a startup switch connected to the main winding; and a driving pulse generator for outputting a driving pulse to the startup switch for turning ON the startup switch.

17 Claims, 25 Drawing Sheets

FIG. 8

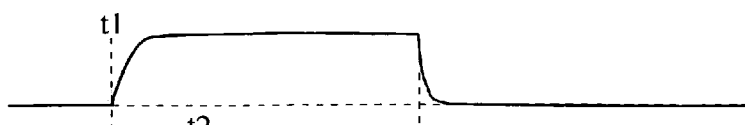
8A Waveform at point A

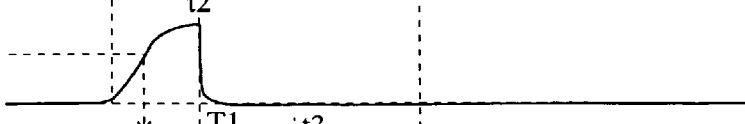
8B Waveform at point B

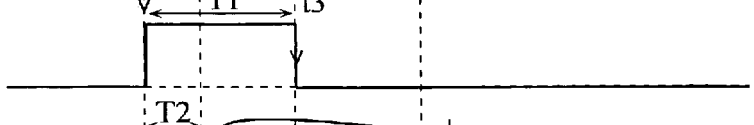
8C Waveform at point C

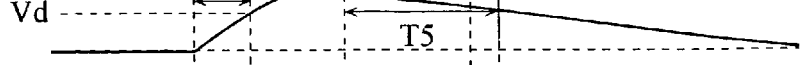
8D Waveform at point G

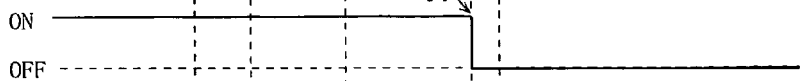
8E Output of second switch S2

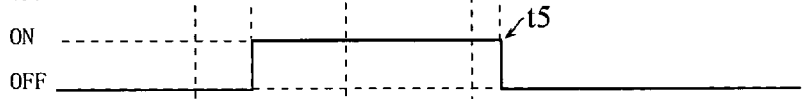
8F Output of first switch S1

8G Waveform at point D

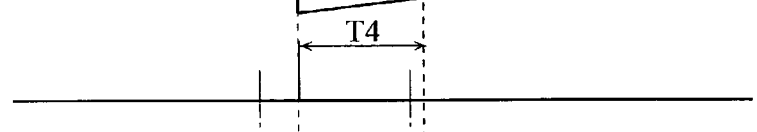
8H Waveform at point E

8I Output of auxiliary winding Tc

8J Output of auxiliary winding Tb

8K Waveform at point F

Waveform at point E

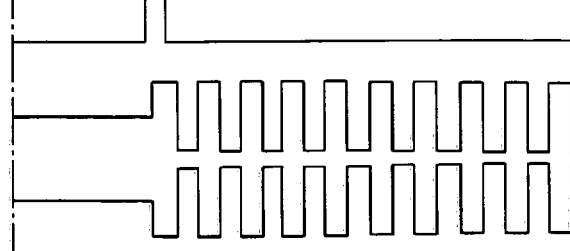
Output of auxiliary winding Tc

Output of auxiliary winding Tb

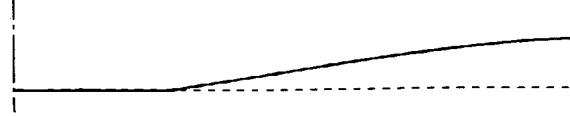
Waveform at point F

SWITCHING POWER SUPPLY CIRCUIT

BACKGROUND OF THE INVENTION

1. Field of the Invention

The present invention relates to a self-excited switching power supply circuit.

2. Description of the Related Art

Conventionally, self-excited switching control has been widely employed as a switching control method for a switching power supply (e.g., Japanese Laid-Open Patent Publication No. 2003-61343). Typically, a self-excited switching power supply is provided with a startup circuit for turning ON a switching element at power-ON so as to bring the switching element to a continuous ON/OFF switching state.

FIG. 29 shows an example of a self-excited switching power supply (push-pull type). The configuration of the switching power supply will be described briefly. The switching power supply includes a power supply-receiving circuit 41 for receiving a commercial power supply, and input-side rectifier circuit 42 is connected to the power supply-receiving circuit 41 for converting an alternating-current voltage to a direct-current voltage. On the downstream side of the input-side rectifier circuit 42, an electrolytic capacitor Ce is connected in parallel to the input-side rectifier circuit 42, with the cathode side of the electrolytic capacitor Ce being connected to the middle point of a main winding Ta' wound around on the primary winding side of a high-frequency transformer T' via an inductor Lc.

One end of the main winding Ta' is connected to a first transistor Q11 of an NPN type, for example, and the other end thereof is connected to the second transistor Q12. The base terminal of a first transistor Q11 is connected to a startup resistor Re, which is connected to the cathode side of the electrolytic capacitor Ce, and is connected to one end of a first auxiliary winding Tb' via a resistor R21 and a capacitor C11, which are connected in series with each other. The base terminal of a second transistor Q12 is connected to the other end of the first auxiliary winding Tb' via a resistor R22 and a capacitor C12, which are connected in series with each other. A resistor R23 is provided between the base terminal of the first transistor Q11 and a 0 V line, and a resistor R24 is provided between the base terminal of the second transistor Q12 and the 0 V line. Flywheel diodes D11 and D12 are provided between the collector and the emitter of the first transistor Q11 and the second transistor Q12, respectively.

An output-side rectifier circuit 43 is connected to the secondary winding of the high-frequency transformer T' for converting an alternating-current voltage induced by the secondary winding to a direct-current voltage, and a smoothing circuit 44 including the smoothing choke coil Ld and a smoothing capacitor Cf is connected to the output-side rectifier circuit 43.

The switching power supply operates as follows. While receiving no commercial power supply, there is no voltage at the bases of the first and second transistors Q11 and Q12, and therefore the first and second transistors Q11 and Q12 are OFF and not in a switching state.

When a commercial power supply is applied, the commercial power supply is rectified by the input-side rectifier circuit 42, thus generating a direct-current voltage V+. The direct-current voltage V+ produces a current flow through the startup resistor Re and the resistor R23. Then, the direct-current voltage V+ increases, and when it exceeds the base-emitter threshold voltage of the first transistor Q11, a current starts to flow through the base of the first transistor Q11.

When a current flows through the base of the first transistor Q11, the first transistor Q11 starts transitioning to the ON state, and a current i flows through the main winding Ta' of the high-frequency transformer T' (see FIG. 29). When a current flows through the main winding Ta' of the high-frequency transformer T', an induced voltage is generated across the first auxiliary winding Tb'.

The induced voltage further increases the base potential of the first transistor Q11, whereby the first transistor Q11 rapidly transitions to the ON state. Since the electromotive force is of such a polarity that the base potential of the second transistor Q12 is decreased, the second transistor Q12 is reverse-biased and the second transistor Q12 remains OFF.

While the first transistor Q11 is ON, the exciting current through the main winding Ta' of the high-frequency transformer T' increases over time. However, the effective magnetic permeability decreases as the magnetic saturation region of the core of the high-frequency transformer T' is approached. Since this decreases the amount of magnetic flux change, the voltage induced by the first auxiliary winding Tb' decreases, thereby lowering the base potential of the first transistor Q11.

As the base current of the first transistor Q11 decreases so that the ON state of the first transistor Q11 can no longer be maintained, the exciting current through the main winding Ta' switches from increasing to decreasing, thereby inverting the polarity of the electromotive force of the first auxiliary winding Tb'. Thus, the base potential of the first transistor Q11 decreases, and the first transistor Q11 rapidly transitions to the OFF state. The base potential of the second transistor Q12 increases, and the second transistor Q12 rapidly transitions to the ON state. Thereafter, the polarity of the electromotive force of the first auxiliary winding Tb' is inverted repeatedly so as to alternately turn ON/OFF the first and second transistors Q11 and Q12.

In order for the switching power supply to transition from a state where the first and second transistors Q11 and Q12 are not in a switching state to another state where they are in a stable switching state, it is necessary to select an appropriate value for the resistance of the startup resistor Re.

Specifically, in the first transistor Q11, it is necessary that the forward bias voltage from the startup resistor Re is canceled by the inverted electromotive force of the first auxiliary winding Tb', thereby reliably turning OFF the first transistor Q11. However, if the value of the startup resistor Re is too small, the electromotive force occurring in the first auxiliary winding Tb' may not be able to produce a sufficient voltage for inverting the ON/OFF state of the first and second transistors Q11 and Q12. Then, the first transistor Q11 may not be able to be turned OFF, thus maintaining the ON state of the first transistor Q11.

If the first transistor Q11 remains ON, the current increases to such a degree that the collector current of the first transistor Q11 is restricted by the series resistance of the internal circuit. Then, the first transistor Q11 may break down due to an overcurrent.

If the value of the startup resistor Re is too large, the system cannot even be started in some cases. Specifically, in order to turn ON the first transistor Q11, it is necessary to produce a current flow through the base of the first transistor Q11 such that the direct-current voltage V+ exceeds the base-emitter threshold voltage of the first transistor Q11. However, if the value of the startup resistor Re is too large, it becomes hard for a current to flow through the base of the first transistor Q11.

Therefore, the value of the startup resistor Re needs to be such that it produces a current flow sufficient to properly turn ON the first transistor Q11 at startup while it decreases the base current of the first transistor Q11 to finally turn OFF the first transistor Q11 as the induced voltage across the first auxiliary winding Tb' decreases.

As described above, with a switching power supply receiving a commercial power supply (e.g., AC 100 V), the direct-current voltage V+ is dependent on the voltage of the commercial power supply. Therefore, the direct-current voltage V+ will vary and fluctuate significantly. Since the startup resistor Re receives the direct-current voltage V+ directly supplied thereto, a fluctuation of the direct-current voltage V+ also varies the current flow through the startup resistor Re, in which case it will be even more difficult to reliably turn ON/OFF the first transistor Q11.

Moreover, since the startup resistor Re is statically present in the circuit even while the first and second transistors Q11 and Q12 are repeatedly turned ON/OFF, not a small amount of power is consumed due to the resistance of the startup resistor Re.

It is therefore an object of the present invention to provide a self-excited switching power supply in which switching elements can be reliably started and brought to an ON/OFF switching state.

SUMMARY OF THE INVENTION

A switching power supply circuit of the present invention includes: a transformer including a main winding and an auxiliary winding, which are magnetically coupled together on a primary winding side; a switching element for intermittently supplying a direct-current voltage to the main winding; and a controller for turning ON/OFF the switching element using a voltage induced across the auxiliary winding by the intermittent supply of the direct-current voltage, wherein the switching power supply circuit includes a startup circuit, the startup circuit including: a startup switch connected to the main winding; and a driving pulse generator for outputting a driving pulse to the startup switch for turning ON the startup switch.

With this configuration, as the startup switch is turned ON by the driving pulse output from the driving pulse generator, a current flows through the main winding connected to the startup switch, thereby generating an induced voltage across the auxiliary winding, which turns ON/OFF the switching element. Thus, it is possible to reliably start the switching element and bring the switching element to an ON/OFF switching state.

Preferably, the startup circuit further includes: an operation detector for detecting whether or not the ON/OFF switching operation of the switching element has started; and an output controller for, when the start of the ON/OFF switching operation of the switching element is not detected by the operation detector within a first predetermined period, outputting a driving pulse to the driving pulse generator for turning ON the startup switch again.

Preferably, the driving pulse generator includes a first pulse generating section for generating a reference pulse, and a second pulse generating section for generating the driving pulse based on the reference pulse generated from the first pulse generating section; and the output controller includes a switch section turned ON/OFF to thereby control whether or not to generate the reference pulse from the first pulse generating section, a delay circuit section for delaying the reference pulse generated from the first pulse generating section to turn OFF the switch section at delayed timing, thereby allowing the first pulse generating section to generate a next reference pulse.

Preferably, the startup circuit further includes: a power supply providing section for providing a power supply to the startup circuit; and a supply stopping section for, when the start of the ON/OFF switching operation of the switching element is detected by the operation detector, stopping the provision of the power supply from the power supply providing section.

Preferably, the operation detector includes a determination section for rectifying and integrating a voltage induced across the auxiliary winding and detecting whether or not the integrated value exceeds a predetermined threshold value; and the supply stopping section includes a switch section that is turned OFF when it is determined by the determination section that the integrated value exceeds the predetermined threshold value, thereby stopping the provision of the power supply from the power supply providing section.

Preferably, the startup circuit further includes an operation controller for terminating an operation of the driving pulse generator when the start of the ON/OFF switching operation of the switching element is not detected by the operation detector within a second predetermined period, which is longer than the first predetermined period.

Preferably, where the controller is a saturable reactor, the startup circuit further includes a reset section for outputting a reset signal for resetting a residual magnetic flux of the saturable reactor.

Preferably, a cycle by which the reference pulse is generated from the first pulse generating section is longer than the first predetermined period.

Preferably, a pulse width of the driving pulse is shorter than an ON/OFF cycle of the switching element.

Preferably, the switching power supply circuit further includes a protection circuit, the protection circuit including: an overcurrent detector for detecting a flow of an overcurrent in the circuit; and an oscillation stopping section for stopping the ON/OFF switching operation of the switching element based on a detection result from the overcurrent detector.

Preferably, the protection circuit further includes an ON operation stopping section for preventing the output controller of the startup circuit from turning ON the startup switch again, based on a detection result from the overcurrent detector.

Preferably, the overcurrent detector includes a current detection resistor connected to the switching element, and a thyristor having a trigger input terminal connected to the current detection resistor, wherein after the thyristor is turned ON by a trigger input signal received through the trigger input terminal, the thyristor maintains the ON state; and the oscillation stopping section stops the ON/OFF switching operation of the switching element in response to the thyristor being turned ON.

Preferably, the switching power supply circuit further includes a protection circuit, the protection circuit including: an overheat detector for detecting an excessive temperature increase in the circuit; and an oscillation stopping section for stopping the ON/OFF switching operation of the switching element based on a detection result from the overheat detector.

Preferably, the protection circuit further includes an ON operation stopping section for preventing the output controller of the startup circuit from turning ON the startup switch again, based on a detection result from the overheat detector.

Preferably, the overheat detector includes a temperature sensor for detecting a temperature, and a thyristor having a trigger input terminal indirectly connected to the temperature sensor, wherein after the thyristor is turned ON by a trigger input signal received through the trigger input terminal, the thyristor maintains the ON state; and the oscillation stopping section stops the ON/OFF switching operation of the switching element in response to the thyristor being turned ON.

BRIEF DESCRIPTION OF THE DRAWINGS

FIGS. 8A to 8K are timing diagrams showing an operation of a startup circuit of the second embodiment.

DETAILED DESCRIPTION OF THE PREFERRED EMBODIMENTS

Preferred embodiments of the present invention will now be described with reference to the accompanying drawings.

Embodiment 1

Figure 1:
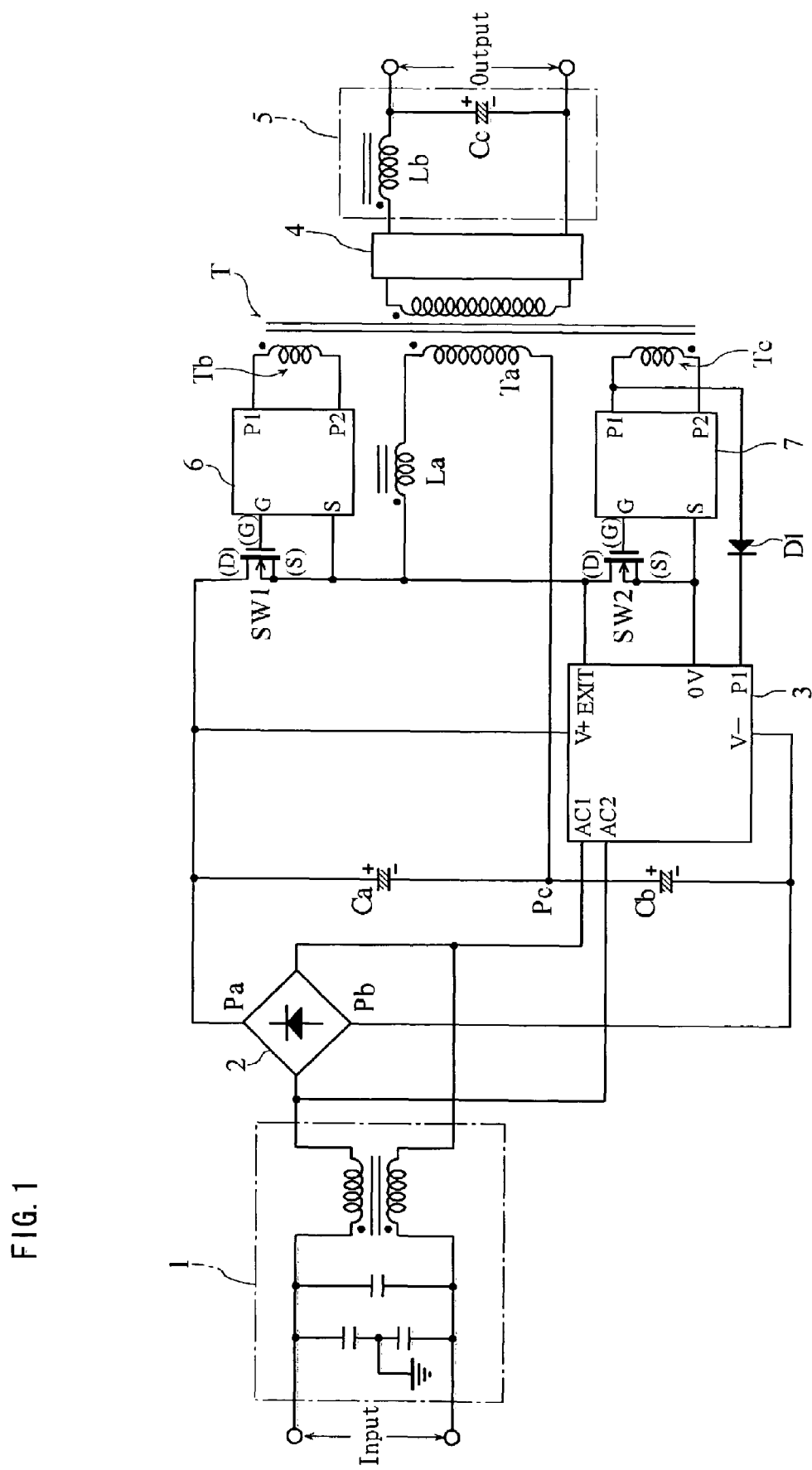
FIG. 1 shows a circuit configuration of a switching power supply according to a first embodiment of the present invention.

FIG. 1 shows a circuit configuration of a switching power supply according to a first embodiment of the present invention. The switching power supply is of a so-called "self-excited half-bridge type". A direct-current voltage obtained by rectifying and smoothing an alternating-current voltage from a commercial alternating-current power supply, for example, is subjected to a switching operation by switching elements so as to be converted to an alternating-current voltage with a higher frequency. An intended direct-current voltage is produced from the alternating-current voltage by using a high-frequency transformer and a rectifying-smoothing circuit.

Figure 29:
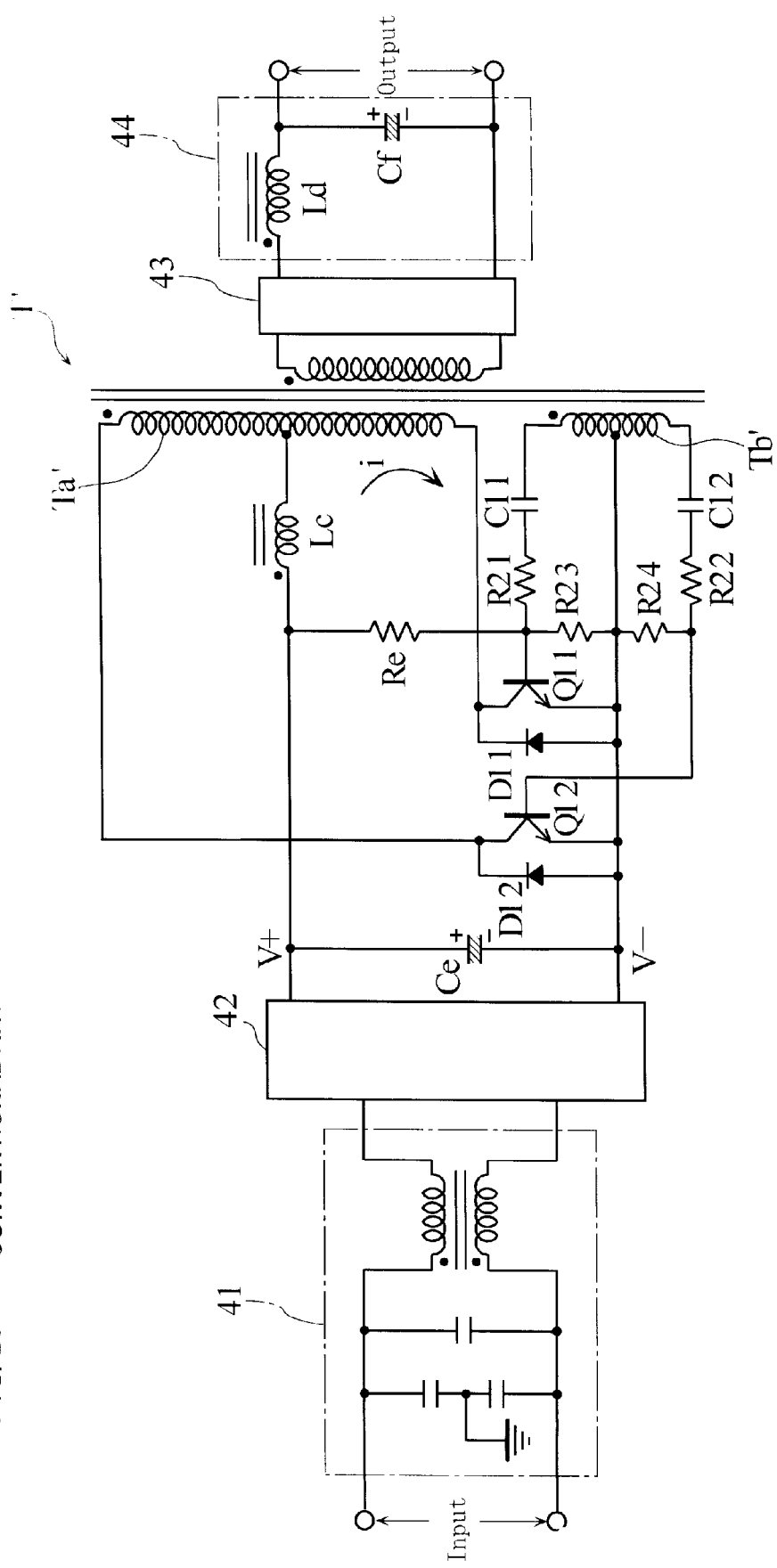
FIG. 29 shows a conventional self-excited switching power supply.

The switching power supply of the first embodiment includes a startup circuit 3 (to be described later) capable of more reliably starting the switching elements, instead of the startup resistor Re for starting the ON/OFF switching operation of the switching elements (see FIG. 29). This will now be described in detail.

The switching power supply shown in FIG. 1 includes a power supply-receiving circuit 1 for receiving, for example, a commercial power supply (e.g., AC 100 V), and the power supply-receiving circuit 1 includes a plurality of capacitors and a plurality of coils. Connected to the power supply-receiving circuit 1 are an input-side rectifier circuit 2 and also the startup circuit 3, being characteristic of the present embodiment.

The input-side rectifier circuit 2 is a circuit for rectifying and smoothing an alternating-current voltage obtained from a commercial alternating-current power supply. For example, the input-side rectifier circuit 2 is a diode bridge circuit. The startup circuit 3 is for starting first and second switching elements SW1 and SW2 (to be described later). The startup circuit 3 produces a current flow through a main winding Ta of a high-frequency transformer T (to be described later) when starting the switching elements.

Two electrolytic capacitors, Ca and Cb, which are connected in series with each other, are connected in parallel to the input-side rectifier circuit 2, and the startup circuit 3 is also connected to the input-side rectifier circuit 2. Therefore, the startup circuit 3 receives an alternating-current voltage that is the output from the power supply-receiving circuit 1 and a smoothed direct-current voltage that is the output from the input-side rectifier circuit 2. The alternating-current voltage output from the power supply-receiving circuit 1 is input to power supply terminals AC1 and AC2 of the startup circuit 3, and is converted to a bias voltage of a second switch S2 of the startup circuit 3 to be described later. The direct-current voltage output from the input-side rectifier circuit 2 is input to power supply terminals V+ and V− of the startup circuit 3, and is used as the power supply voltage of the startup circuit 3.

The first switching element SW1 is connected in series with the input-side rectifier circuit 2, and the second switching element SW2 is connected in series with the first switching element SW1. The first and second switching elements SW1 and SW2 are MOS-FETs, for example.

First and second oscillation controlling circuits 6 and 7 are connected to the first and second switching elements SW1 and SW2, respectively. The first and second oscillation controlling circuits 6 and 7 are circuits for turning ON/OFF the first and second switching elements SW1 and SW2, respectively.

These elements are connected with one another as follows. The drain terminal (D) of the first switching element SW1 is connected to the output terminal Pa of the input-side rectifier circuit 2. Control terminals G and S of the first oscillation controlling circuit 6 are connected to the gate terminal (G) and the source terminal (S), respectively, of the first switching element SW1. The drain terminal (D) of the second switching element SW2 is connected to the source terminal (S) of the first switching element SW1, and an external output terminal EXT of the startup circuit 3 is connected to the drain terminal (D). Control terminals G and S of the second oscillation controlling circuit 7 are connected to the gate terminal (G) and the source terminal (S), respectively, of the second switching element SW2. A ground terminal (0V) of the startup circuit 3 is connected to the source terminal (S).

The cathode side of the inductor La is connected to the source terminal (S) of the first switching element SW1, and the cathode side of the main winding Ta, which is wound around on the primary winding side of the high-frequency transformer T, is connected to the anode side. Connection point Pc between the first and second electrolytic capacitors Ca and Cb is connected to the anode side of the main winding Ta.

A voltage supply terminal P1 of the first oscillation controlling circuit 6 is connected to the cathode side of the first auxiliary winding Tb, which is wound around on the primary winding side of the high-frequency transformer T, and a voltage supply terminal P2 is connected to the anode side of the first auxiliary winding Tb. A voltage supply terminal P1 of the second oscillation controlling circuit 7 is connected to the anode side of the second auxiliary winding Tc, which is wound around on the primary winding side of the high-frequency transformer T, and a voltage supply terminal P2 is connected to the cathode side of the second auxiliary winding Tc. When an electromotive force is generated across the main winding Ta on the primary winding side of the high-frequency transformer T, induced voltages are generated across the first auxiliary winding Tb and the second auxiliary winding Tc, which are supplied to the first and second oscillation controlling circuits 6 and 7.

As the first and second oscillation controlling circuits 6 and 7 receive the induced voltages supplied from the first and second auxiliary windings Tb and Tc of the high-frequency transformer T, the first and second oscillation controlling circuits 6 and 7 turn ON/OFF the first and second switching elements SW1 and SW2, respectively.

A voltage input terminal P1 of the startup circuit 3 is connected to the anode side of the second auxiliary winding Tc via a rectifier diode D1. As will be described later, the startup circuit 3 detects an induced voltage being received through the voltage input terminal P1, and prevents a direct-current voltage received through the power supply terminals V+ and V− from being supplied to various internal circuits, for example.

An output-side rectifier circuit 4 is connected to the secondary winding side of the high-frequency transformer T, and a smoothing circuit 5, including a smoothing choke coil Lb and a smoothing capacitor Cc, is connected to the output-side rectifier circuit 4.

Figure 2:
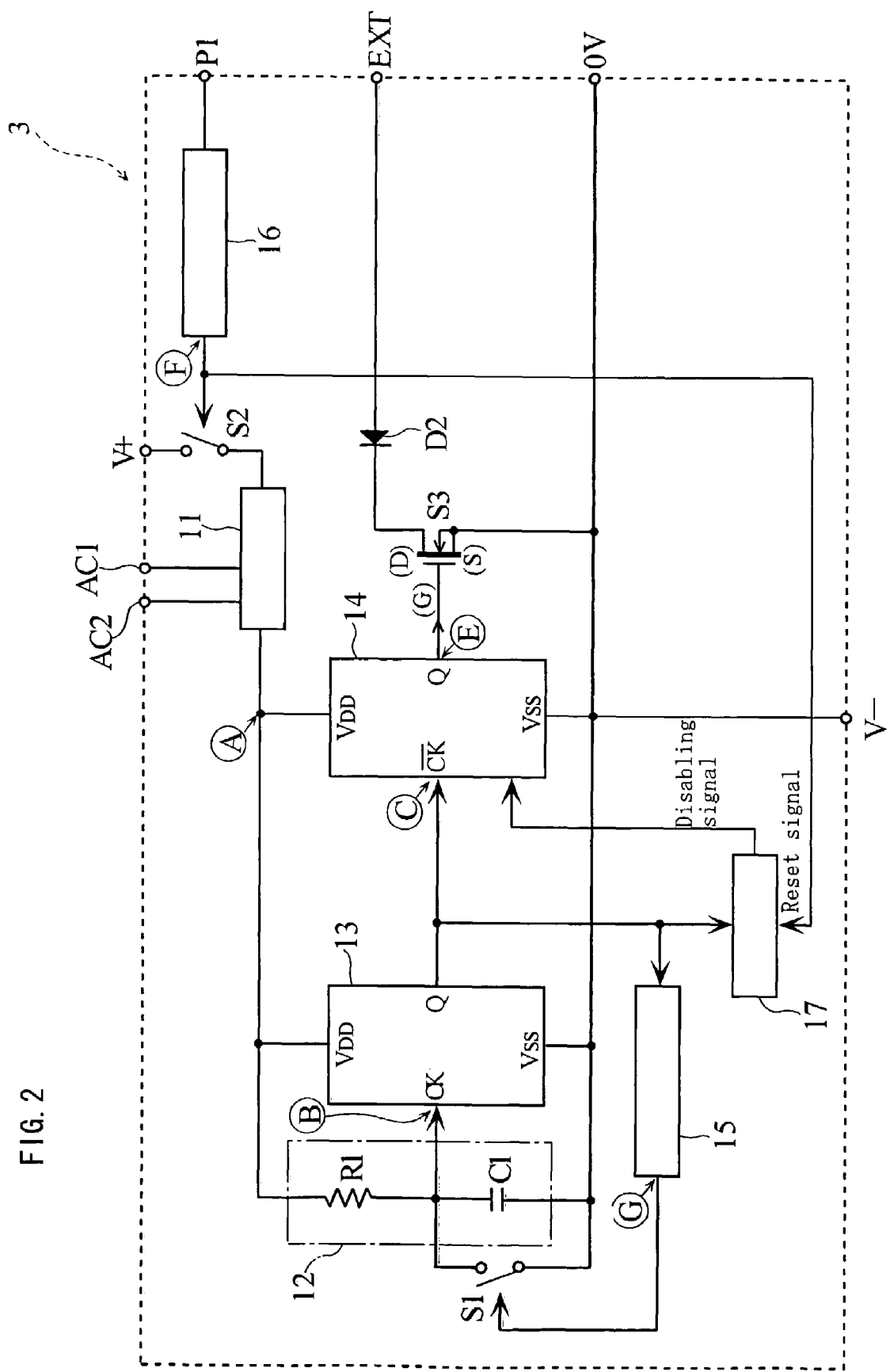
FIG. 2 shows a block configuration of a startup circuit.

FIG. 2 shows a block configuration of the startup circuit 3.

The startup circuit 3 includes a power supply circuit 11, a time constant circuit 12, a first timer circuit 13, a second timer circuit 14, a first delay circuit 15, a second delay circuit 16, an integration circuit 17, a first switch S1, a second switch S2, a startup switch S3, etc.

The power supply circuit 11 supplies the direct-current voltage, which is received through the power supply terminals V+ and V−, to the first and second timer circuits 13 and 14, the time constant circuit 12, etc. The second switch S2 allows or blocks the input of the direct-current voltage from the power supply terminals V+ and V− to the power supply circuit 11. Thus, the power supply circuit 11 can allow or block the power supply to the various circuits. Note that the power supply circuit 11 serves as the power supply providing section of the present invention.

The time constant circuit 12 supplies the direct-current voltage from the power supply circuit 11 to the first timer circuit 13 with a predetermined delay. For example, the time constant circuit 12 is a circuit including a resistor R1 and a capacitor C1 connected in series with each other.

The first timer circuit 13 is a monostable multivibrator, for example, for generating, based on the output from the time constant circuit 12, a reference pulse signal serving as a reference for the driving pulse signal to be output to the startup switch S3. The ON period of the reference pulse signal (corresponding to a first predetermined period T1 to be described later) is set to 2 to 5 msec, for example. As will be described later, the first timer circuit 13 can repeatedly output the reference pulse signal by turning ON/OFF the first switch S1.

As is the first timer circuit 13, the second timer circuit 14 is a monostable multivibrator, for example, for generating, based on the reference pulse signal from the first timer circuit 13, a driving pulse signal for turning ON the startup switch S3. The ON period of the driving pulse signal is set to 5 to 10 μsec, for example. The ON period (corresponding to a third predetermined period T3 to be described later) is determined to be slightly shorter than ½ the oscillation period of the first and second switching elements SW1 and SW2. Since the oscillation frequency of the first and second switching elements SW1 and SW2 is typically 50 to 200 kHz, in which case the ½ period is 2.5 to 10 μsec, the ON period is determined as shown above. Note that the first and second timer circuits 13 and 14 serve as the driving pulse generator of the present invention. The present invention is not limited to the first and second timer circuits 13 and 14 as long as the circuits can generate driving pulse signals.

The first delay circuit 15 turns ON/OFF the first switch S1 based on the reference pulse signal from the first timer circuit 13. Specifically, the first delay circuit 15 gives the first switch S1 a switching signal for switching the first switch Si from OFF to ON after elapse of a predetermined period of time (e.g., 1 msec, corresponding to a second predetermined period T2 to be described later) since the input of the reference pulse signal from the first timer circuit 13. The first delay circuit 15 gives the first switch S1 a switching signal for switching the first switch S1 from ON to OFF after elapse of a predetermined period of time (e.g., 3 msec, corresponding to a fifth predetermined period T5 to be described later) since when the reference pulse signal stops being output from the first timer circuit 13.

The second delay circuit 16 gives the induced voltage from the second auxiliary winding Tc received through the voltage input terminal P1 to the second switch S2 with a delay of a predetermined period of time (e.g., 2 msec, corresponding to a fourth predetermined period T4 to be described later). The predetermined period of time is provided for ensuring that a continuous oscillating state of the first and second switching elements SW1 and SW2 is reliably achieved. For example, when the oscillation of the first and second switching elements SW1 and SW2 continues over some 100 cycles, it can be determined that the first and second switching elements SW1 and SW2 have entered a stable oscillating state.

As described above, when the induced voltage is received through the voltage input terminal P1, a switching signal for switching the second switch S2 from ON to OFF is given by the second delay circuit 16 to the second switch S2 after elapse of the fourth predetermined period T4. Thus, the second switch S2 is turned OFF, thereby blocking the input of the direct-current voltage to the power supply circuit 11 through the power supply terminals V+ and V−.

The integration circuit 17 integrates the output from the first timer circuit 13, and disables the second timer circuit 14 when the integrated value exceeds a predetermined threshold value. When the first and second switching elements SW1 and SW2 stop oscillating due to a circuit failure, or the like, the first timer circuit 13 repeatedly outputs the reference pulse signal. The integration circuit 17 detects the repeated output of the reference pulse signal, and stops the second timer circuit 14 from outputting the driving pulse signal after a few seconds, for example. A disabling signal from the integration circuit 17 disables the second timer circuit 14, whereby the driving pulse signal is no longer output to the startup switch S3.

The integration circuit 17 is reset based on the output from the second delay circuit 16. A counter may be provided instead of the integration circuit 17.

The first switch S1 disables the clock input to the first timer circuit 13 at predetermined timing. The first switch S1 is turned ON/OFF based on the output from the first delay circuit 15. The first switch S1 enables the operation of the time constant circuit 12 while it is OFF, and disables the clock input to the first timer circuit 13 while it is ON. Thus, when the first attempt to start the first and second switching elements SW1 and SW2 fails, the first switch S1 is switched from ON to OFF to enable the clock input to the first timer circuit 13 so as to generate the reference pulse signal, thereby attempting the startup operation again.

The second switch S2 is given the bias voltage based on the alternating-current voltage received through the power supply terminals AC1 and AC2, and allows or blocks the input of the direct-current voltage from the power supply terminals V+ and V− to the power supply circuit 11 based on the output from the second delay circuit 16. At system power-ON, the second switch S2 is ON and thus allows the input of the direct-current voltage to the power supply circuit 11. When the second switch S2 is turned OFF by the second delay circuit 16, the second switch S2 blocks the input of the direct-current voltage to the power supply circuit 11. Then, the power supply voltage is no longer supplied to the circuits inside the startup circuit 3, thus terminating the operation of the startup circuit 3.

The startup switch S3, when turned ON based on the output from the second timer circuit 14, pulls in a current flowing through the main winding Ta shown in FIG. 1 via the external output terminal EXT and provides an exciting current flowing through the main winding Ta. As a current flows through the main winding Ta, an induced voltage is generated across the second auxiliary winding Tc, whereby the second switching element SW2 is turned ON by the second oscillation controlling circuit 7.

The startup switch S3 is a MOS-FET, for example, for providing an exciting current flowing through the main winding Ta at startup. Therefore, the startup switch S3 is of a low-power type as compared with the first and second switching elements SW1 and SW2. The drain terminal (D) of the startup switch S3 is connected to the external output terminal EXT via a reverse current-preventing diode D2. The startup switch S3 may be a bipolar transistor, for example. With a bipolar transistor, however, the operating speed may be insufficient. Therefore, the startup switch S3 is more preferably a MOS-FET.

Figure 3:
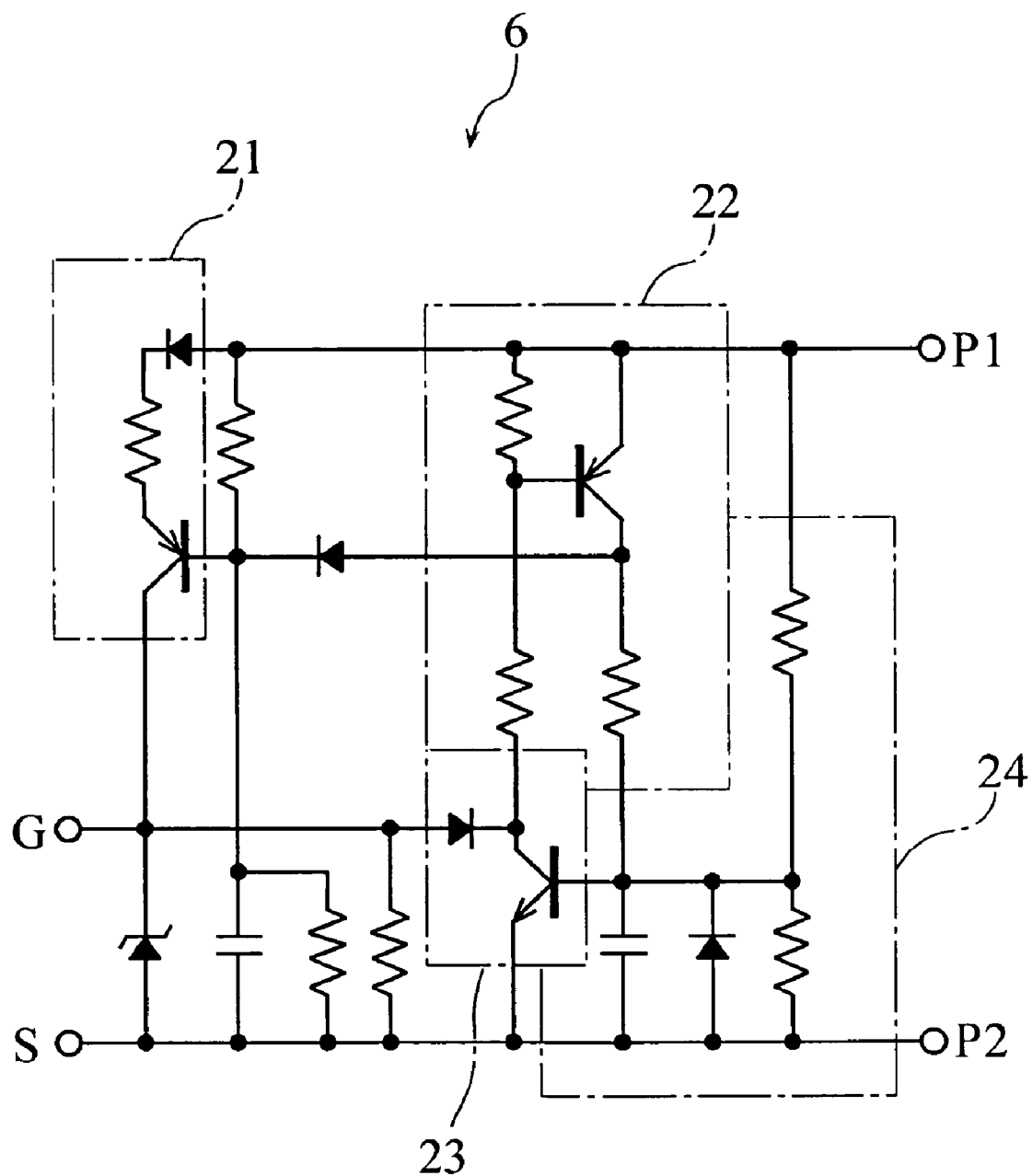
FIG. 3 shows a circuit configuration of a first oscillation controlling circuit or a second oscillation controlling circuit.

FIG. 3 shows a circuit configuration of the first oscillation controlling circuit 6 or the second oscillation controlling circuit 7. The first and second oscillation controlling circuits 6 and 7 have the same circuit configuration. Therefore, only a general description of the first oscillation controlling circuit 6 will be provided below, and that of the second oscillation controlling circuit 7 will not be provided. The first oscillation controlling circuit 6 includes a series control element circuit 21, a positive feedback circuit 22, an auxiliary switch circuit 23, a time constant circuit 24, etc.

The first oscillation controlling circuit 6 determines, by means of the time constant circuit 24, the period of time over which a driving voltage is supplied to the first switching element SW1. When the determined period of time elapses, the first oscillation controlling circuit 6 forcibly stops, by means of the auxiliary switch circuit 23, the supply of the driving voltage to the first switching element SW1.

Thus, the first oscillation controlling circuit 6 can eliminate the portion of the ON period of the first switching element SW1, in which switching loss occurs, thereby suppressing the occurrence of the switching loss. The operation of the circuit will not herein be described in detail, as such detailed description is given in a co-assigned patent application (Japanese Patent Application No. 2005-43851).

The function of the circuit configuration of the startup circuit 3 as described above will now be described with reference to timing diagrams of FIGS. 4A to 4J.

As the startup switch S3 of the switching power supply is turned ON, the startup circuit 3 provides an exciting current through the main winding Ta to generate an induced voltage across the second auxiliary winding Tc to thereby turn ON the second switching element SW2, thus bringing the first and second switching elements SW1 and SW2 to the oscillating state. If the transition to the oscillating state fails, the startup switch S3 is again turned ON so as to bring the first and second switching elements SW1 and SW2 to the oscillating state. If the transition to the oscillating state succeeds, the power supply to the startup circuit 3 is blocked to terminate the operation of the startup circuit 3, thereby suppressing the power consumption. This will now be described in detail.

In the startup circuit 3, the first switch S1 is OFF and the second switch S2 is ON when the system power is turned ON. When the system power is turned ON, a predetermined direct-current voltage (e.g., DC 5 V) is output from the power supply circuit 11 to various circuits in the startup circuit 3, as shown at t1 in FIG. 4A (see point A in FIG. 2).

The direct-current voltage output from the power supply circuit 11 is input to a clock terminal CK of the first timer circuit 13 via the time constant circuit 12 (see point B in FIG. 2). The direct-current voltage rises with a predetermined delay due to the resistor R1 and the capacitor C1 of the time constant circuit 12 (see FIG. 4B).

Figure 4:
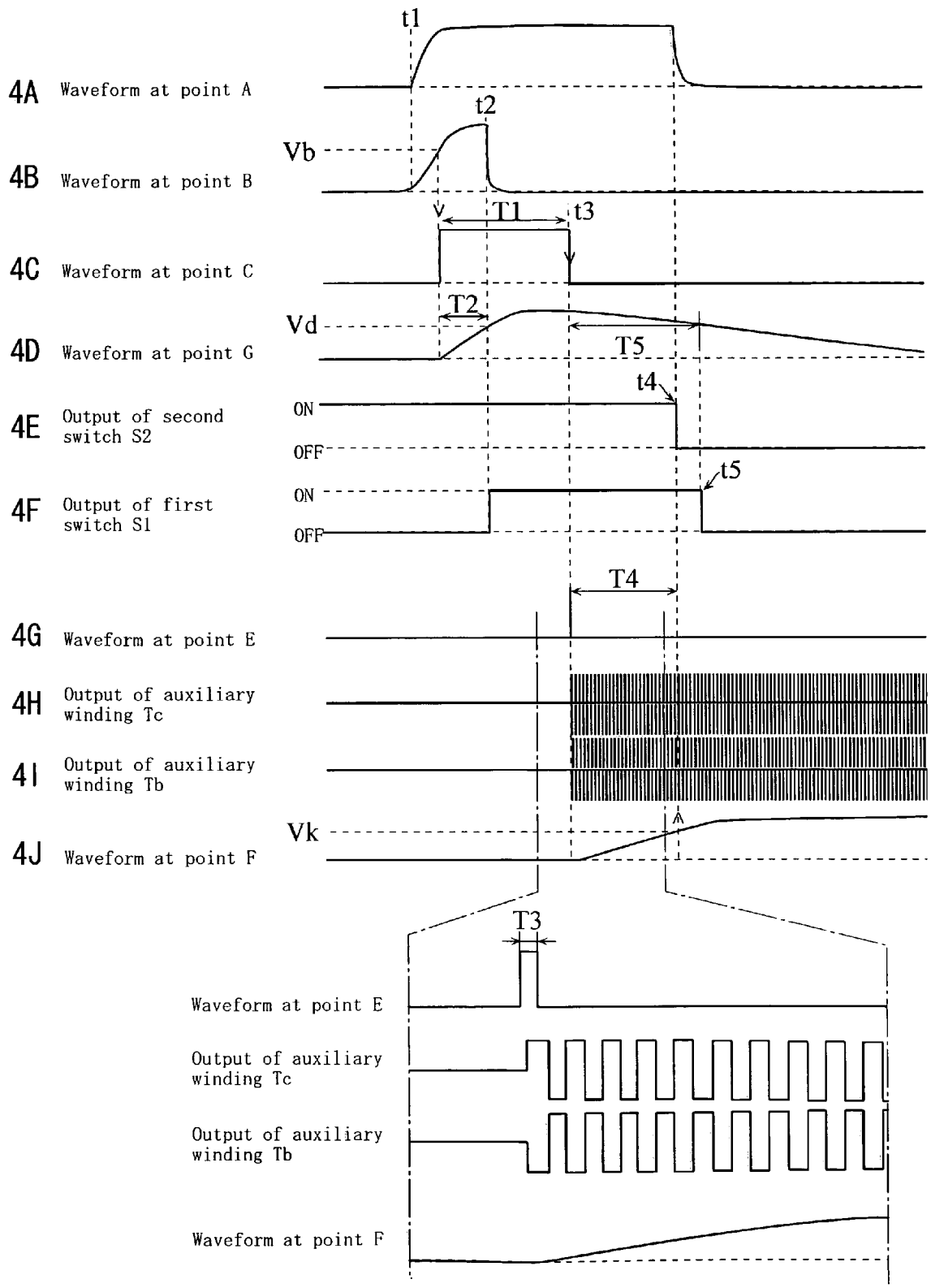
FIGS. 4A to 4J are timing diagrams showing an operation of a startup circuit.
Figure 5:
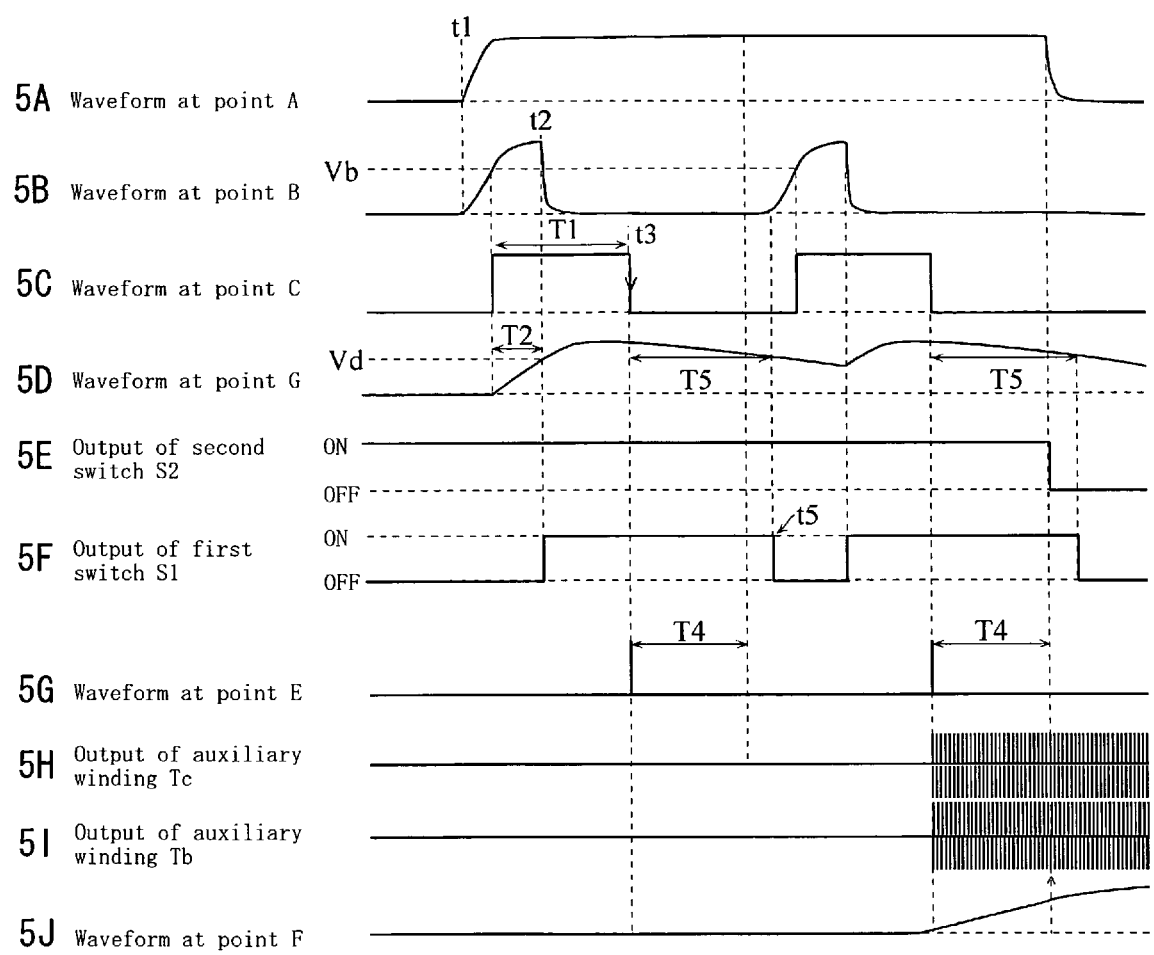
FIGS. 5A to 5J are timing diagrams showing an operation of a startup circuit, for a case where an oscillating state of first and second switching elements is achieved in the second startup operation after failing in the first attempt.

When the output voltage from the time constant circuit 12 becomes equal to a predetermined voltage value Vb, the first timer circuit 13 recognizes the voltage as being at the H level, and then outputs the reference pulse signal from an output Q (see point C in FIG. 2) as shown in FIG. 4C. The reference pulse signal is a signal that remains at the H level for the first predetermined period T1 (e.g., 2 to 5 msec), and is input to a clock terminal CK of the second timer circuit 14.

The output Q of the first timer circuit 13 is also input to the first delay circuit 15, and is input to the first switch S1 while being delayed by the first delay circuit 15 for the second predetermined period T2 (see FIG. 4D). Specifically, in the first delay circuit 15, a predetermined threshold voltage Vd (see FIG. 4D) is determined so as to output a switching signal to the first switch S1 after elapse of the second predetermined period T2 based on the output Q of the first timer circuit 13. Thus, the first delay circuit 15 outputs the switching signal to the first switch S1 when the delayed voltage value exceeds the threshold voltage Vd. Then, the first switch S1 transitions from OFF to ON, thereby resetting the clock input CK of the first timer circuit 13 to a low level ("L level") (see t2 in FIG. 4B). The second predetermined period T2 for the first delay circuit 15 is preferably about 1 msec so as to eliminate the influence of the noise component in the clock input CK of the first timer circuit 13.

A clock input CK of the second timer circuit 14 is such that a timer operation is started when it is brought to the L level. Therefore, when the output Q of the first timer circuit 13 is brought to the L level (see t3 in FIG. 4C), a driving pulse signal is output from the output Q (see point E in FIG. 2). Thus, the output Q of the second timer circuit 14 outputs the H level for the third predetermined period T3 (see FIG. 4G).

The driving pulse signal, which is the output from the second timer circuit 14, is supplied to the startup switch S3, whereby the startup switch S3 is turned ON for the third predetermined period T3. When the startup switch S3 is turned ON, an exciting current is provided through the main winding Ta shown in FIG. 1. With the exciting current, there is generated an induced voltage such that the cathode side of the second auxiliary winding Tc is positive with respect to the anode side (with a reverse-phase voltage being generated across the first auxiliary winding Tb), and the induced voltage turns ON the second switching element SW2 via the second oscillation controlling circuit 7.

After elapse of a predetermined period of time from the transition of the second switching element SW2 to the ON state, the second switching element SW2 is forcibly turned OFF by the second oscillation controlling circuit 7. As the second switching element SW2 is turned OFF, the magnetic flux change of the high-frequency transformer T is inverted, whereby there is generated an induced voltage such that the cathode side of the first auxiliary winding Tb is positive with respect to the anode side (with a reverse-phase voltage being generated across the second auxiliary winding Tc), which rapidly brings the first switching element SWI to the ON state and the second switching element SW2 to the OFF state. The oscillation of the first and second switching elements SW1 and SW2 is thus started, after which a direct-current voltage is output intermittently.

If the first and second switching elements SW1 and SW2 are brought to a continuous oscillating state by the startup operation as described above (see FIGS. 4H and 4I), the induced voltage generated across the second auxiliary winding Tc is rectified through the rectifier diode D1 and input to the voltage input terminal P1 of the startup circuit 3, and is delayed through the second delay circuit 16 by the fourth predetermined period T4 (e.g., 2 msec; see FIG. 4G) (see FIG. 4J).

Specifically, in the second delay circuit 16, a threshold voltage Vk (see FIG. 4J) is determined so as to output a switching signal to the second switch S2 after elapse of the fourth predetermined period T4 based on the induced voltage input to the voltage input terminal P1. Thus, the second delay circuit 16 outputs the switching signal to the second switch S2 when the delayed voltage value exceeds the threshold voltage Vk. Then, the second switch S2 transitions from ON to OFF (see t4 in FIG. 4E), thereby stopping the input of the power supply to the various circuits in the startup circuit 3 (see FIG. 4A).

Thus, it is possible to reduce the amount of power to be wasted. Specifically, with the conventional configuration, in which the startup resistor Re is statically present, power is wasted by the startup resistor Re after a continuous oscillating state is achieved. In the present embodiment, the power supply is terminated in the startup circuit 3 after a continuous oscillating state is achieved, thereby suppressing the amount of power to be wasted.

Then, the first delay circuit 15 outputs the switching signal to the first switch S1 after elapse of the fifth predetermined period T5 since when the reference pulse signal from the first timer circuit 13 falls, whereby the first switch S1 transitions from ON to OFF (see t5 in FIG. 4D).

The timing diagrams of FIGS. 4A to 4J show a case where an oscillating state the first and second switching elements SW1 and SW2 is achieved by turning ON the startup switch S3 in one attempt. However, the oscillating state may not be achieved in one attempt.

FIGS. 5A to 5J show a case where an oscillating state of the first and second switching elements SW1 and SW2 is achieved by turning ON the startup switch S3 in the second attempt after failing in the first attempt.

If an attempt to achieve a continuous oscillating state of the first and second switches SW1 and SW2 fails, no induced voltage is generated across the second auxiliary winding Tc, whereby a sufficient voltage will not appear at the voltage input terminal P1 of the startup circuit 3. Therefore, the second switch S2 is not switched from ON to OFF, and the power supply continues to be provided from the power supply circuit 11 (see FIG. 5A).

Then, the first switch S1 is switched from ON to OFF by the first delay circuit 15 after elapse of the fifth predetermined period T5 (see FIG. SD) since when the output Q of the first timer circuit 13 is brought to the L level (see t5 in FIG. SF). As the first switch S1 is turned OFF, the capacitor C1 of the time constant circuit 12 again starts to be charged by the resistor R1, and when the rising voltage exceeds the threshold voltage Vb, the voltage is input to the clock CK of the first timer circuit 13.

Therefore, a reference pulse signal is produced again by the first timer circuit 13, and a driving pulse signal is output from the second timer circuit 14 at the falling edge thereof, thereby turning ON the startup switch S3. The timing diagrams of FIGS. SA to 5J show a case where an oscillating state of the first and second switches SW1 and SW2 is achieved after turning ON the startup switch S3 for the second time.

As described above, with the startup circuit 3, if an oscillating state of the first and second switches SW1 and SW2 is not achieved after a startup operation, the startup operation is performed again. Therefore, it is quite unlikely that malfunctioning occurs at the startup operation, and it is possible to suppress problems such as a device being destroyed by an overcurrent flowing when a startup operation fails.

In order to prevent the interference between the low-power startup switch S3 and the high-power second switching element SW2, the cycle by which the reference pulse signal is repeatedly output from the first timer circuit 13 is preferably longer than the amount of time required from when the first and second switching elements SW1 and SW2 start oscillating until the oscillating state is confirmed (the fourth predetermined period T4).

With the configuration of the first embodiment, if the first and second switching elements SW1 and SW2 stop oscillating because of an abnormality (e.g., a breakdown of a circuit, the input voltage becoming insufficient, etc.), such a condition can be detected, whereby the output of the driving pulse signal is terminated.

Thus, if an abnormality occurs and the first and second switching elements SW1 and SW2 do not start oscillating, the system will keep repeating the re-startup operation as described above. In view of this, in the first embodiment, if the oscillation does not start after a predetermined period of time, it is determined that an abnormality has occurred, and the output of the driving pulse signal is terminated.

Specifically, the output from the first timer circuit 13 is supplied to the integration circuit 17 as well as to the first delay circuit 15. The integration circuit 17 accumulates the H level signal from the first timer circuit 13, and outputs a disabling signal to the second timer circuit 14 when the accumulated H level signal reaches a predetermined threshold voltage. Thus, the operation of the second timer circuit 14 is terminated, and the driving pulse signal is no longer output, whereby the startup switch S3 will not be turned ON. Therefore, the re-startup operation will no longer be performed.

When the oscillation is started normally, a reset signal is output from the second delay circuit 16 to the integration circuit 17, thereby resetting the integration circuit 17. Therefore, the non-oscillation detection operation, which is performed in the case of an abnormality as described above, is not performed.

In the integration circuit 17, the amount of time required before determining that an oscillating state is not achieved is preferably set to be a few seconds, which is longer than the reference pulse signal repeating cycle. The disabling signal from the integration circuit 17 may be used for, in addition to terminating the operation of the second timer circuit 14, turning OFF the second switch S2 to stop the power supply in the startup circuit 3.

The disabling signal from the integration circuit 17 may be externally output via a photocoupler, or the like, and the disabling signal can be used for visually or audibly reporting the abnormality, or for triggering the shutdown of the system power supply itself.

Embodiment 2

Figure 6:
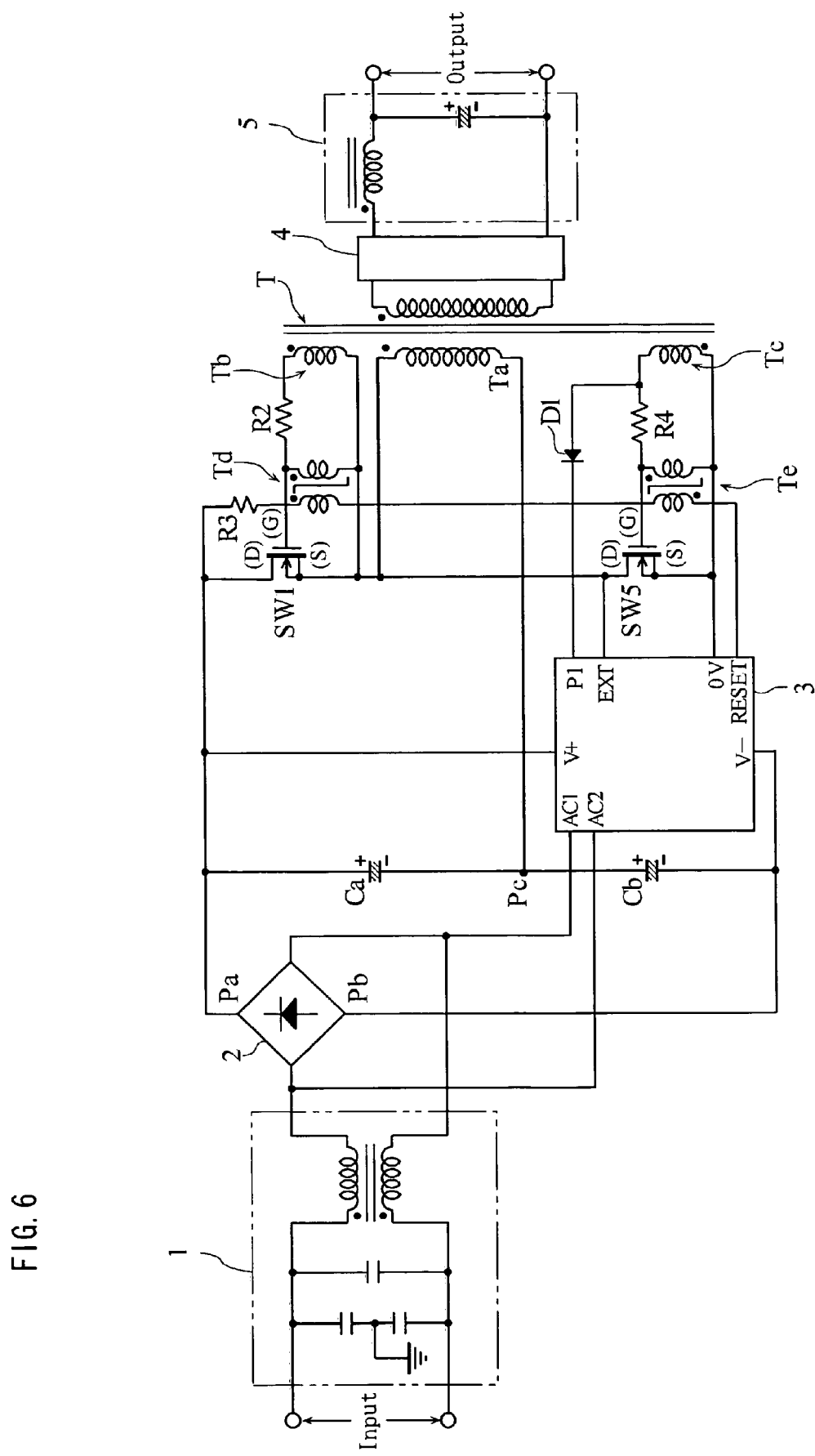
FIG. 6 shows a circuit configuration of a switching power supply according to a second embodiment of the present invention.

FIG. 6 shows a configuration of a switching power supply according to a second embodiment of the present invention. This is a variation to Embodiment 1, and employs an oscillation controlling circuit using a saturable reactor, instead of the first and second oscillation controlling circuits 6 and 7 shown in FIG. 1.

Where a saturable reactor is used for the oscillation controlling circuit, the oscillation may be unstable due to the residual magnetic flux when the system power is OFF and the polarity of the auxiliary winding occurring at the next startup. Therefore, in order to reliably start the second switching element SW2, it is necessary to reset the residual magnetic flux of the saturable reactor before the startup operation (i.e., to adjust the residual magnetic flux so that it provides a high impedance for the rising of the induced voltage of the auxiliary windings Tb and Tc occurring at startup).

Referring to FIG. 6, in the second embodiment, the saturable reactor is a high-frequency transformer. Specifically, a first high-frequency transformer Td is connected in parallel to the first auxiliary winding Tb, and a second high-frequency transformer Te is connected in parallel to the second auxiliary winding Tc.

More specifically, the cathode side of the secondary winding of the first high-frequency transformer Td is connected to the gate terminal (G) of the first switching element SW1 and is connected, via a resistor R2, to the cathode side of the first auxiliary winding Tb. The anode side of the secondary winding of the first high-frequency transformer Td is connected to the source terminal (S) of the first switching element SW1 and is also connected to the anode side of the first auxiliary winding Tb.

The cathode side of the primary winding of the first high-frequency transformer Td is connected to the input-side rectifier circuit 2 via the current-limiting resistor R3. The anode side of the primary winding is connected to the anode side of the primary winding of the second high-frequency transformer Te, and the cathode side of the primary winding of the second high-frequency transformer Te is connected to a reset terminal RESET of the startup circuit 3.

The cathode side of the secondary winding of the second high-frequency transformer Te is connected to the gate terminal (G) of the second switching element SW2, and is also connected to the anode side of the second auxiliary winding Tc via a resistor R4. The anode side of the secondary winding of the second high-frequency transformer Te is connected to the source terminal (S) of the second switching element SW2, and is also connected to the cathode side of the second auxiliary winding Tc.

Figure 7:
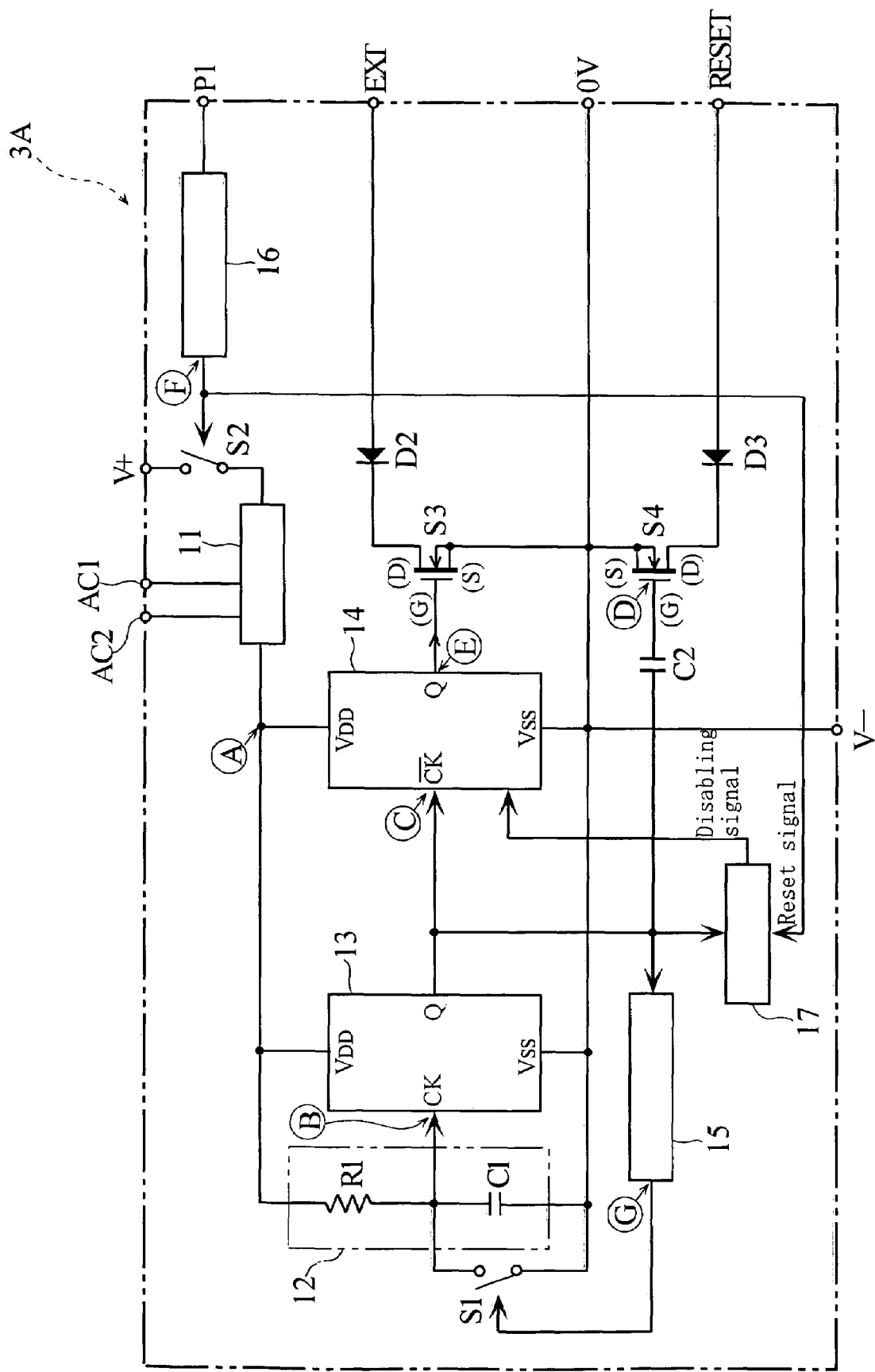
FIG. 7 shows a block configuration of a startup circuit to be employed when a saturable reactor is used.

FIG. 7 shows a block configuration of a startup circuit 3A to be employed when a saturable reactor is used.

As compared with the startup circuit 3 of the first embodiment shown in FIG. 2, the startup circuit 3A additionally includes a reset switch S4 for resetting the saturable reactor. The reset switch S4 is provided in parallel to the startup switch S3, and the source terminal (S) thereof is connected to the source terminal (S) of the startup switch S3. The gate terminal (G) of the reset switch S4 is connected to the first timer circuit 13 via a capacitor C2. The drain terminal (D) of the reset switch S4 is connected to the reset terminal RESET via the rectifier diode D3. Other than this, the configuration is similar to that of the first embodiment.

FIGS. 8A to 8K are timing diagrams showing an operation of the startup circuit 3A. As compared with the timing diagrams of FIGS. 4A to 4J, a voltage waveform at point D in FIG. 7, corresponding to the gate terminal (G) of the reset switch S4, is additionally shown (see FIG. 8G).

Referring to FIGS. 8A to 8K, when the first timer circuit 13 outputs a reference pulse signal (see FIG. 8C), a bias voltage is supplied to the gate terminal (G) of the reset switch S4 via the capacitor C2, thereby turning ON the reset switch S4. As the reset switch S4 is turned ON, an exciting current flows on the primary winding side of the first and second high-frequency transformers Td and Te, thereby resetting the first and second high-frequency transformers Td and Te.

Then, the startup switch S3 is turned ON by the driving pulse signal from the second timer circuit 14, thereby starting the second switching element SW2 and causing the first and second switching elements SW1 and SW2 to oscillate.

Thus, in a switching power supply using a saturable reactor, the saturable reactor can be reset before the startup operation by using the startup circuit 3A. The configuration of the startup circuit 3A is similar to that of the startup circuit 3 of the first embodiment shown in FIG. 3, except for the reset switch S4. Therefore, also with the startup circuit 3A, if the startup operation fails in the first attempt, a re-startup operation is performed automatically, as described above in the first embodiment.

Figure 9:
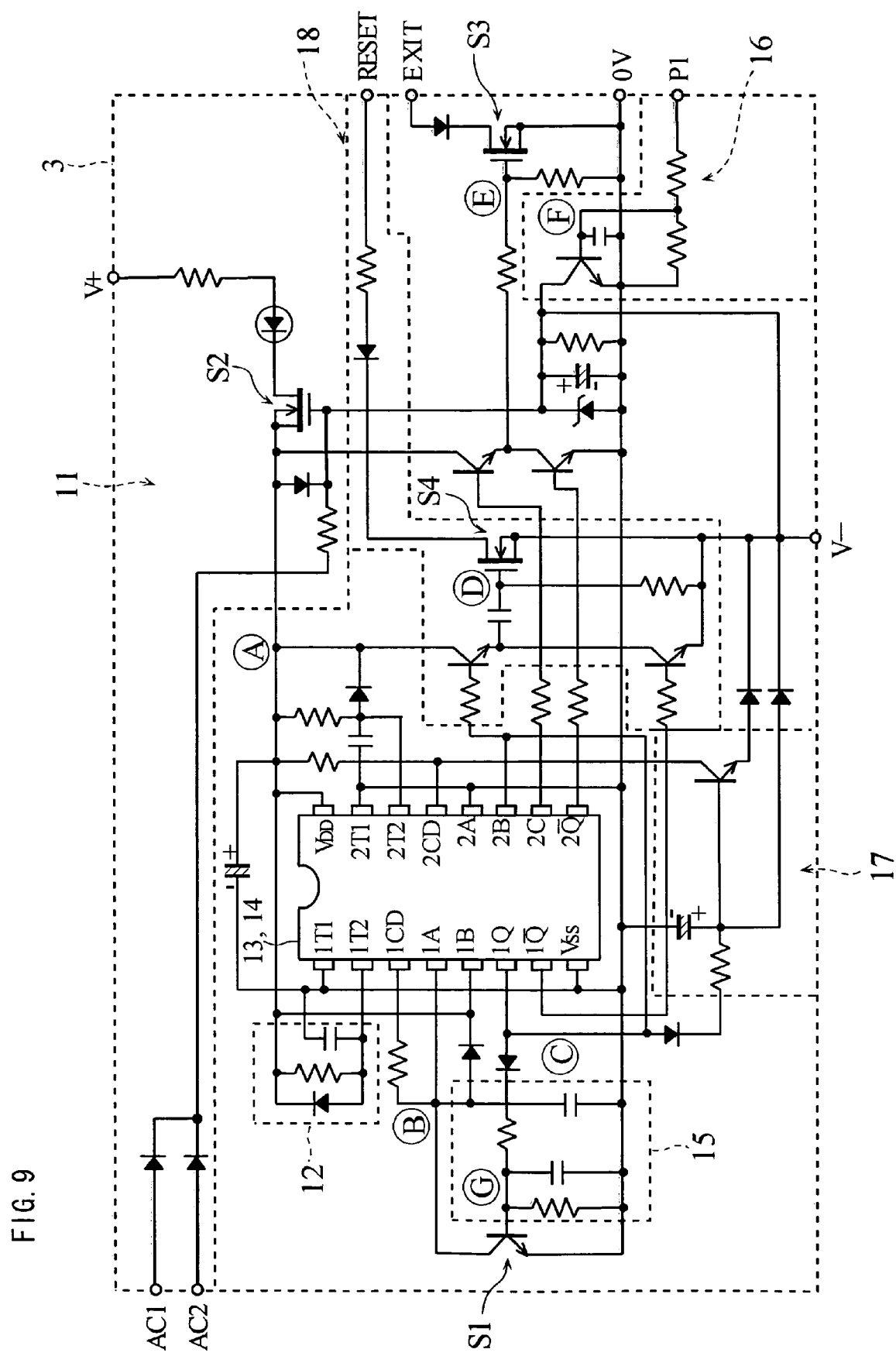
FIG. 9 shows a detailed circuit configuration of a startup circuit shown in FIG. 7.

FIG. 9 shows a detailed circuit configuration of the startup circuit 3A shown in FIG. 7. Referring to the figure, the first and second timer circuits 13 and 14 are implemented in the form of an IC chip, and the power supply circuit 11, the time constant circuit 12, the first delay circuit 15, the second delay circuit 16 and the integration circuit 17 are each represented as a block of the corresponding reference numeral delimited by a dotted line. The circuit denoted by reference numeral 18 in the figure corresponds to the reset switch S4 and surrounding circuits shown in FIG. 7.

Embodiment 3

Figure 10:
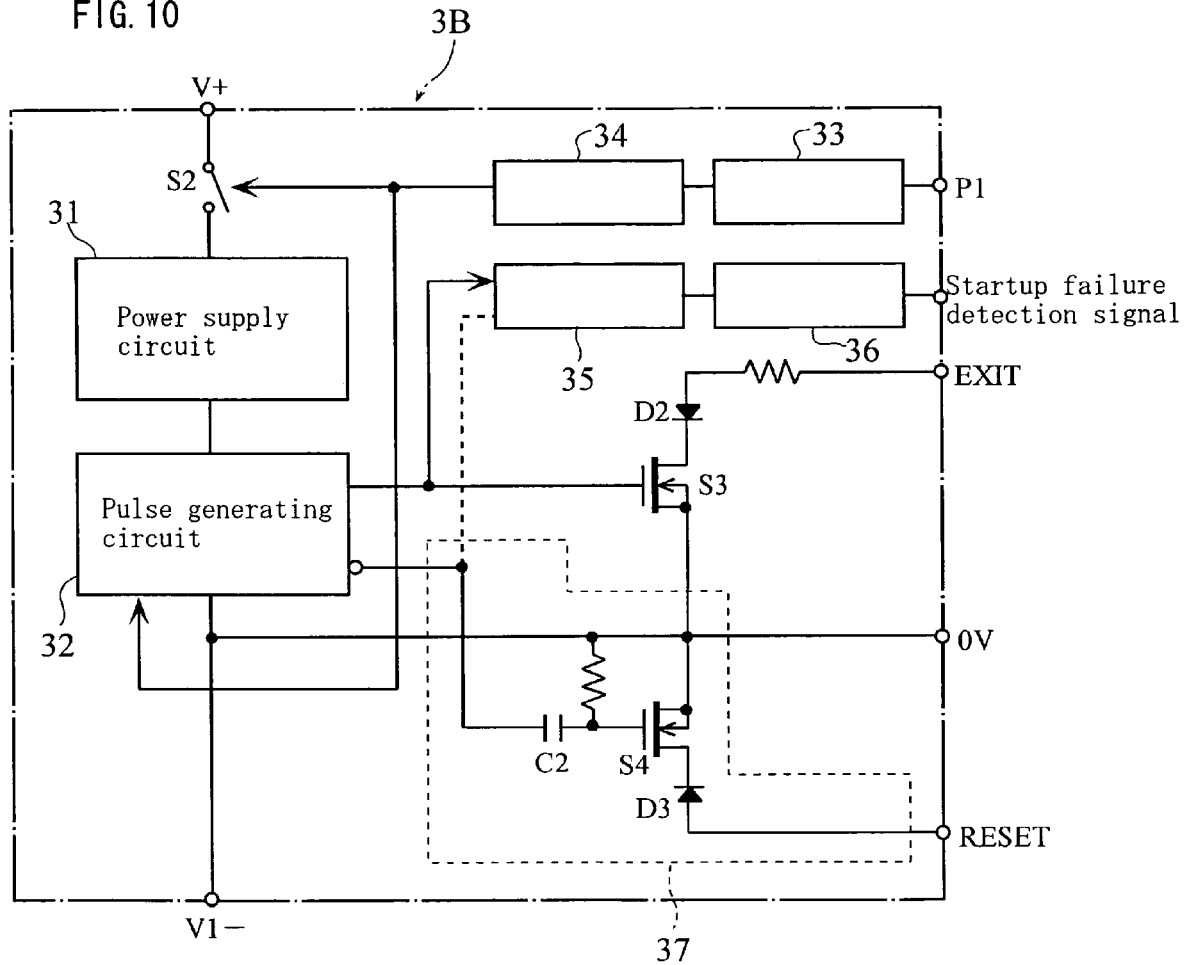
FIG. 10 shows a block configuration of a startup circuit to be employed in a switching power supply according to a third embodiment of the present invention.

FIG. 10 shows a block configuration of a startup circuit 3B to be employed in a switching power supply according to a third embodiment of the present invention.

In the startup circuits 3 and 3A of the first and second embodiments, monostable multivibrators (the first and second timer circuits 13 and 14) are used for generating driving pulses. In the startup circuit 3B of the third embodiment, a pulse generating circuit 32 having a low-duty-cycle oscillator including four CMOS inverter circuits is used for generating driving pulses.

The startup circuit 3B includes a power supply circuit 31, the pulse generating circuit 32, the second switch S2, the startup switch S3, a first integration circuit 33, a first comparator circuit 34, a second integration circuit 35, a second comparator circuit 36, a reset circuit 37, etc.

Figure 11:
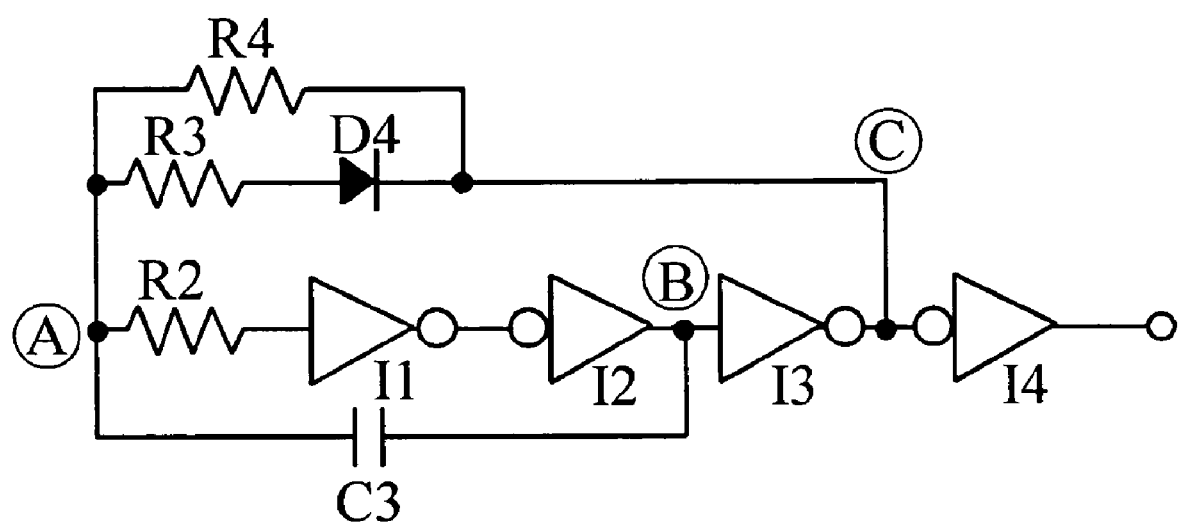
FIG. 11 shows a configuration of a pulse generating circuit.

As shown in FIG. 11, the pulse generating circuit 32 includes four, first to fourth inverter circuits I1 to I4, which are primarily connected in series with one another. More specifically, the first inverter circuit I1 is connected to the second end of the resistor R2. The first end of a capacitor C3 is connected to the first end of the resistor R2, and the output of the second inverter circuit I2 and the input of the third inverter circuit I3 are connected to the second end thereof. The first end of a resistor R3 is connected to the first end of the resistor R2, and the output of the third inverter circuit I3 and the input of the fourth inverter circuit I4 are connected to the second end thereof via a diode D4. The resistor R4 is connected in parallel to, and between opposite ends of, the resistor R3 and the diode D4.

The first integration circuit 33 and the first comparator circuit 34 serve to detect the start of the oscillation of the first and second switching elements SW1 and SW2. Specifically, when an induced voltage generated across the second auxiliary winding Tc is received through the voltage input terminal P1, the first integration circuit 33 rectifies and integrates the received voltage. The first comparator circuit 34 compares the integrated value of the induced voltage with a predetermined threshold value, and outputs a switching signal to the second switch S2 when the integrated value of the induced voltage exceeds the predetermined threshold value.

The second comparator circuit 36 and the second integration circuit 35 serve to detect a non-oscillating state, and to externally output the detection result. Specifically, the second integration circuit 35 integrates the driving pulse signal from the pulse generating circuit 32 to the startup switch S3. The second comparator circuit 36 compares the integrated voltage value from the second integration circuit 35 with a predetermined threshold value, and externally outputs a startup failure detection signal when the integrated voltage value exceeds the predetermined threshold value.

The reset circuit 37 differentiates the inverted output of the pulse generating circuit 32 by the capacitor C2 to output the result to the reset switch S4 as the reset pulse, and externally outputs the reset signal via the reset terminal RESET. Thus, the reset circuit 37 corresponds to the reset switch S2 and surrounding circuits of the second embodiment, and is a circuit that is employed when the oscillation controlling circuits for the first and second switching elements SW1 and SW2 are saturable reactors. Therefore, the reset circuit 37 is not employed if the switching power supply of the first embodiment (see FIG. 1) is used, and is employed if the switching power supply of the second embodiment (see FIG. 6) is used.

The startup circuit 3B is not receiving an alternating-current voltage, being the output from the power supply-receiving circuit 1 (see FIG. 1), and the bias voltage of the second switch S2 is produced by a circuit in the power supply circuit 31.

Figure 12:
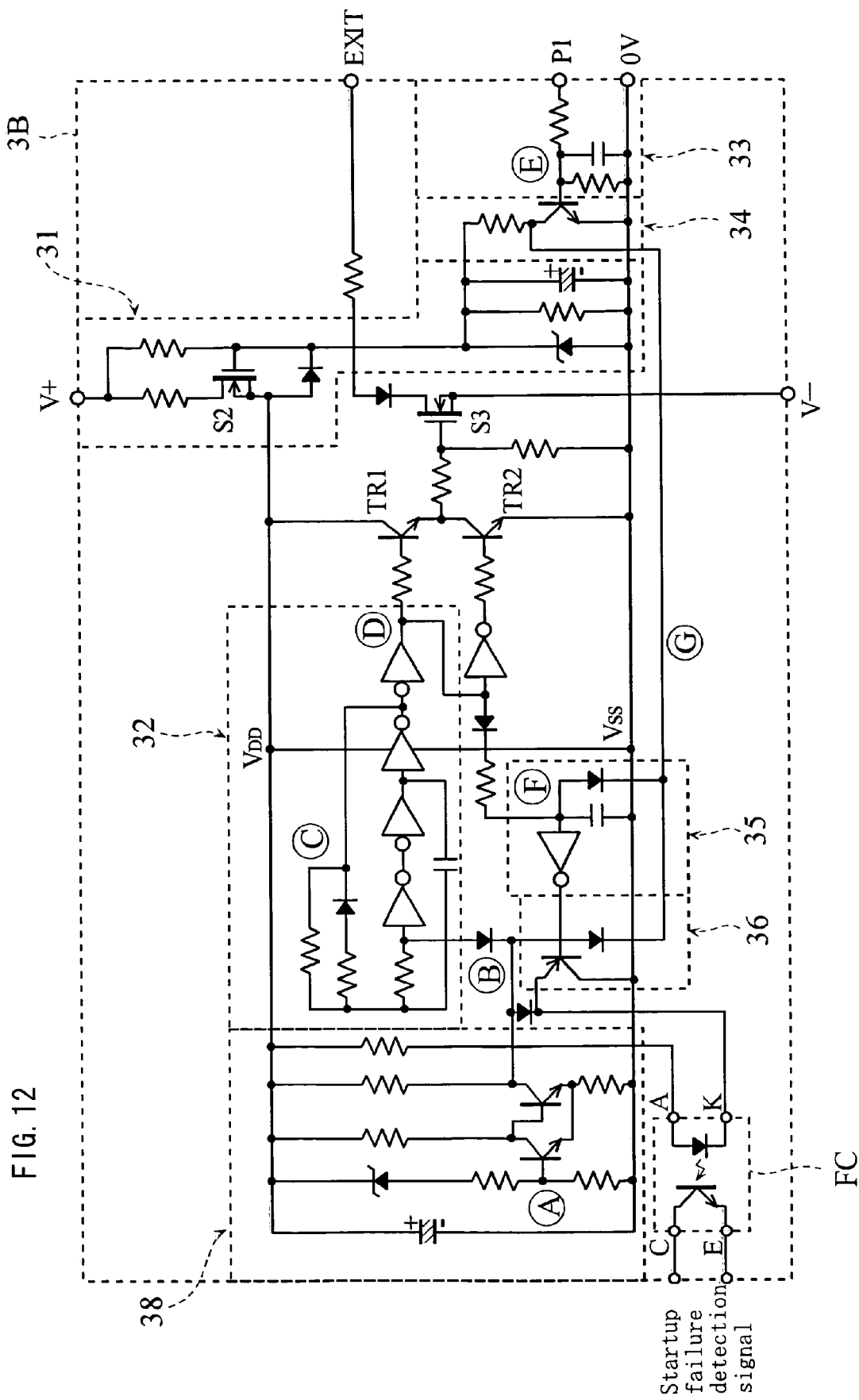
FIG. 12 shows a detailed circuit configuration of a startup circuit shown in FIG., 11.
Figure 13:
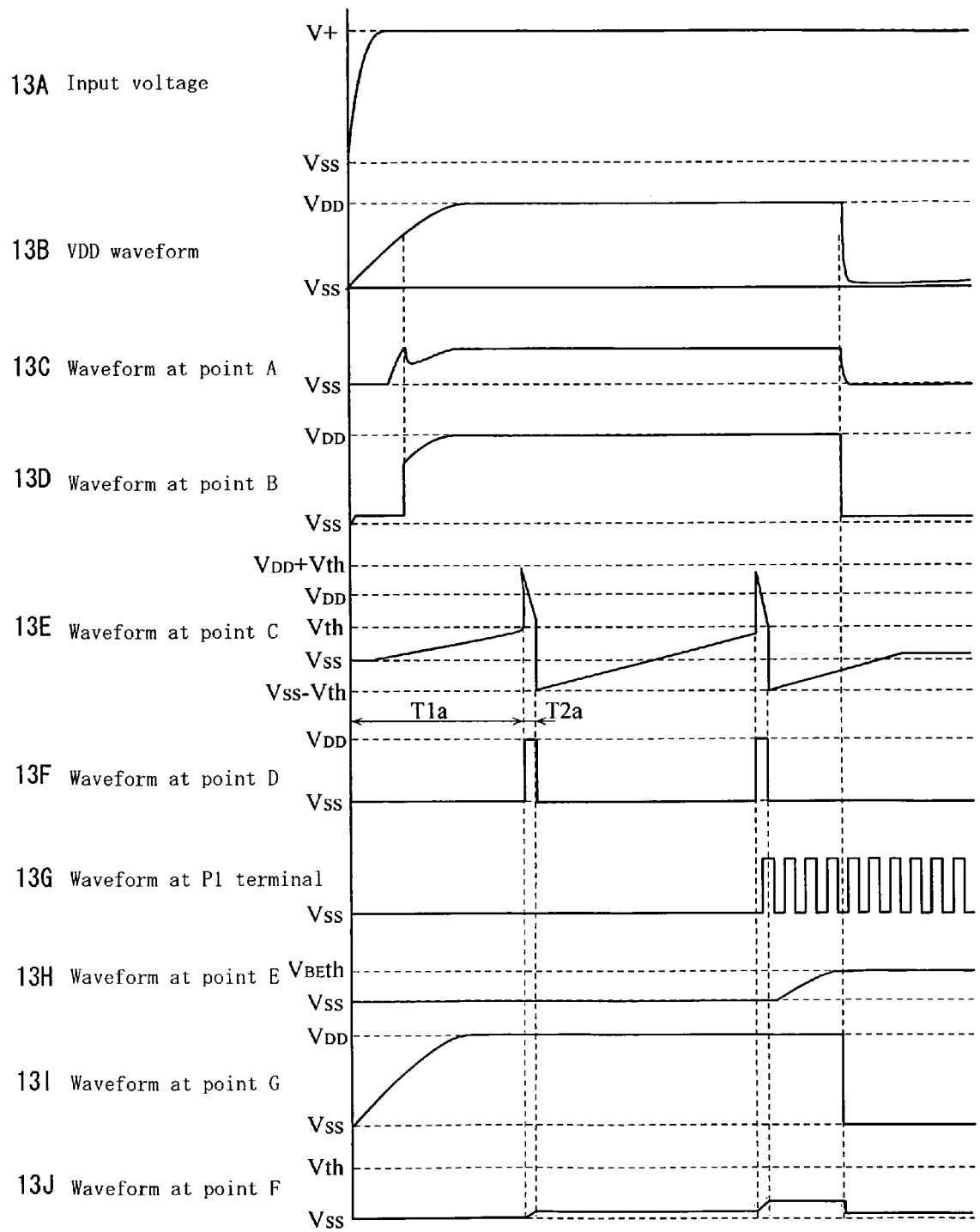
FIGS. 13A to 13J are timing diagrams showing an operation of a startup circuit of the third embodiment.

FIG. 12 shows a detailed circuit configuration of the startup circuit 3B shown in FIG. 11. Referring to the figure, the power supply circuit 11, the pulse generating circuit 32, the first integration circuit 33, the first comparator circuit 34, the second comparator circuit 36, the second integration circuit 35 and the reset circuit 37 are each represented as a block of the corresponding reference numeral delimited by a dotted line. The circuit of FIG. 12 does not include the reset circuit 37.

The operation of the startup circuit 3B of the third embodiment will now be described with reference to the timing diagrams of FIGS. 13A to 13J. The waveforms at points A to F shown in FIGS. 13A to 13J are those seen at points A to F in FIG. 12.

In the startup circuit 3B, the second switch S2 is ON at system power-ON. When the system power is turned ON, a direct-current voltage is applied between the power supply terminals V+ and V− of the startup circuit 3 (see FIG. 13A). Thus, in the power supply circuit 11, a predetermined voltage VDD (VSS in the figures represents the ground voltage) is produced, and the predetermined voltage VDD is applied to the pulse generating circuit 32.

In the pulse generating circuit 32, the voltage at point C is gradually charged by a time constant circuit formed by the resistor R4 and the capacitor C3 during a period T1a (e.g., 4 to 6 msec). The voltage at point C is varied by a time constant circuit formed by a parallel circuit of the resistor R3 and the resistor R4 and the capacitor C3 from a predetermined voltage (VDD+Vth) to a threshold voltage Vth during a period T2a (e.g., 4 to 5 μsec). Thus, a driving pulse signal is generated at point D (see FIG. 13F).

The driving pulse signal is amplified by two transistors TR1 and TR2 connected together in a totem-pole arrangement (see FIG. 12), and is supplied to the startup switch S3. The output driving pulse signal turns ON the startup switch S3, and produces an exciting current flowing through the main winding Ta of the high-frequency transformer T shown in FIG. 1. The exciting current generates an induced voltage across the second auxiliary winding Tc, which turns ON the second switching element SW2. As the second switching element SW2 is turned ON, the first and second switching elements SW1 and SW2 are alternately turned ON/OFF by the second oscillation controlling circuit 7.

Thus, as with the first embodiment using the first and second timer circuits 13 and 14, it is possible to supply the driving pulse signal to the startup switch S3 also by using the pulse generating circuit 32 formed by inverter circuits. As with the timing diagrams of FIGS. 5A to 5J, the timing diagrams of FIGS. 13A to 13J show a case-where a startup operation for the second switching element SW2 succeeds by turning ON the startup switch S3 in the second attempt after failing in the first attempt.

Also with the startup circuit 3B, if an attempt to transition to an oscillating state fails, the pulse generating circuit 32 repeats outputting the driving pulse signal periodically. Specifically, the induced voltage received through the voltage input terminal P1 is rectified and integrated by the first integration circuit 33 (see FIG. 13H), and if it is determined that the integrated value from the first comparator circuit 34 does not exceed a predetermined threshold voltage VBEth, a disabling signal is output to the pulse generating circuit 32 (see FIG. 13I) and the second switch S2 is turned OFF, thereby terminating the supply of the direct-current voltage V+ (see FIG. 13B). The cycle by which the driving pulse signal is repeatedly output is determined by the time constant circuit including the resistors R3 and R4 and the capacitor C3 in the pulse generating circuit 32.

The second integration circuit 35 and the second comparator circuit 36 integrates the startup pulse signal from the pulse generating circuit 32 (see FIG. 13J), and it is determined that the startup operation has failed when the integrated value exceeds a predetermined level. Then, a startup failure detection signal is externally output via a photocoupler PC (see FIG. 12).

The circuit denoted by reference numeral 38 in FIG. 12, which is not directly related to the present invention, is a circuit for holding the pulse generating circuit 32 at system power-ON until the power supply voltage of the pulse generating circuit 32 becomes greater than or equal to a predetermined voltage in order to avoid an incomplete ON state of the startup switch S3.

Embodiment 4

With the switching power supplies of the preceding embodiments, a circuit malfunction may occur in a case where an overcurrent flows in the circuit or the temperature of the circuit excessively increases (hereinafter referred to collectively as an "overloaded state"). Specifically, in an overloaded state, active elements such as the first and second switching elements SW1 and SW2 are adversely influenced. For example, the first and second switching elements SW1 and SW2 may no longer enter a normal oscillating state (switching state).

In view of this, if a switching power supply is brought to an overloaded state, it is necessary to forcibly terminate the oscillating state of the first and second switching elements SW1 and SW2. While the startup circuit 3 is capable of a re-startup operation for attempting to achieve the oscillating state of the first and second switching elements SW1 and SW2 after failing in the first attempt at power-ON, it is necessary to even prevent the re-startup operation from being performed when in an overloaded state.

Figure 14:
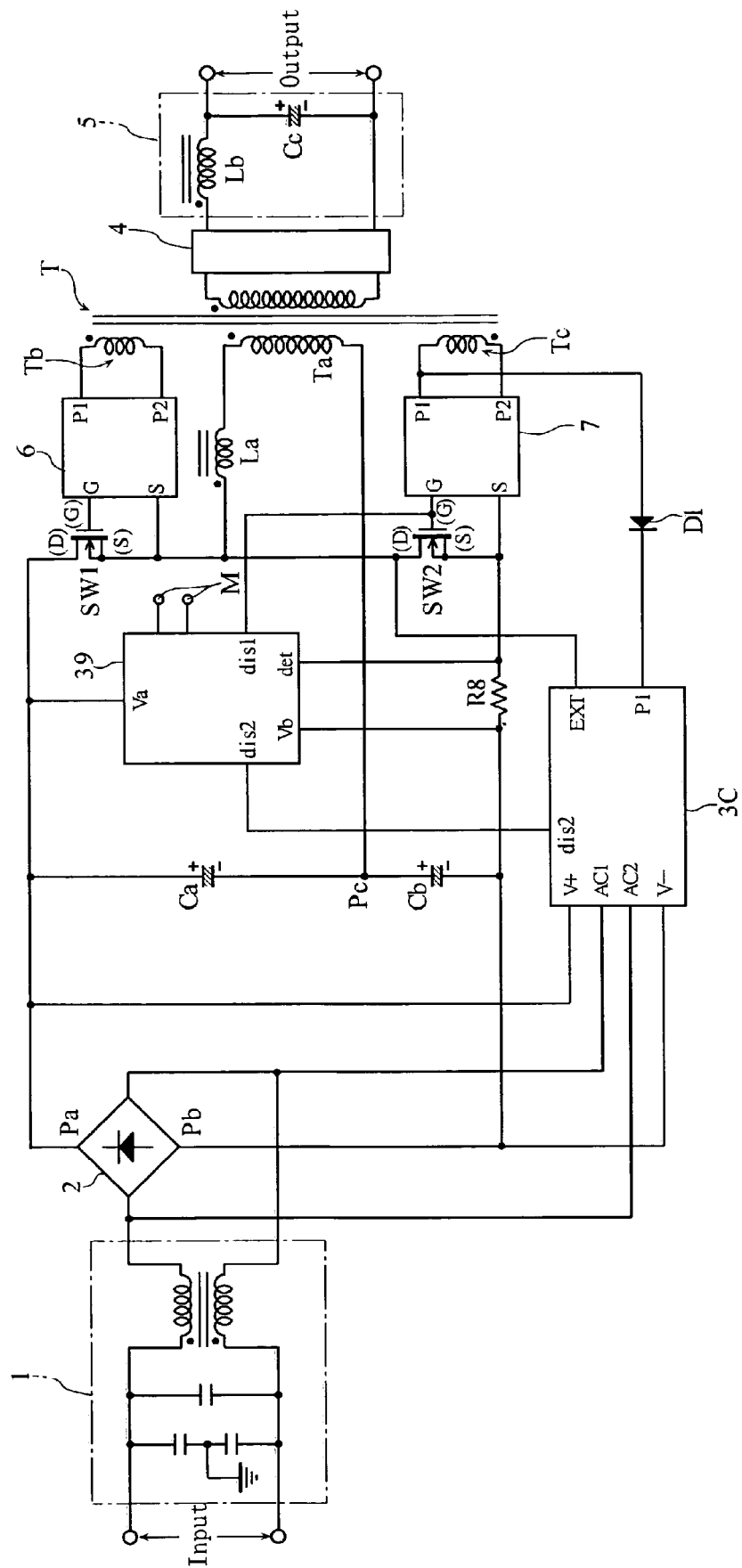
FIG. 14 shows a circuit configuration of a switching power supply according to a fourth embodiment of the present invention.

A switching power supply according to a fourth embodiment of the present invention includes a protection circuit 39 as shown in FIG. 14. The protection circuit 39 is a circuit for detecting an overcurrent in the circuit to terminate the oscillating state of the first and second switching elements SW1 and SW2 and stop the startup circuit 3 from performing the re-startup operation.

Figure 15:
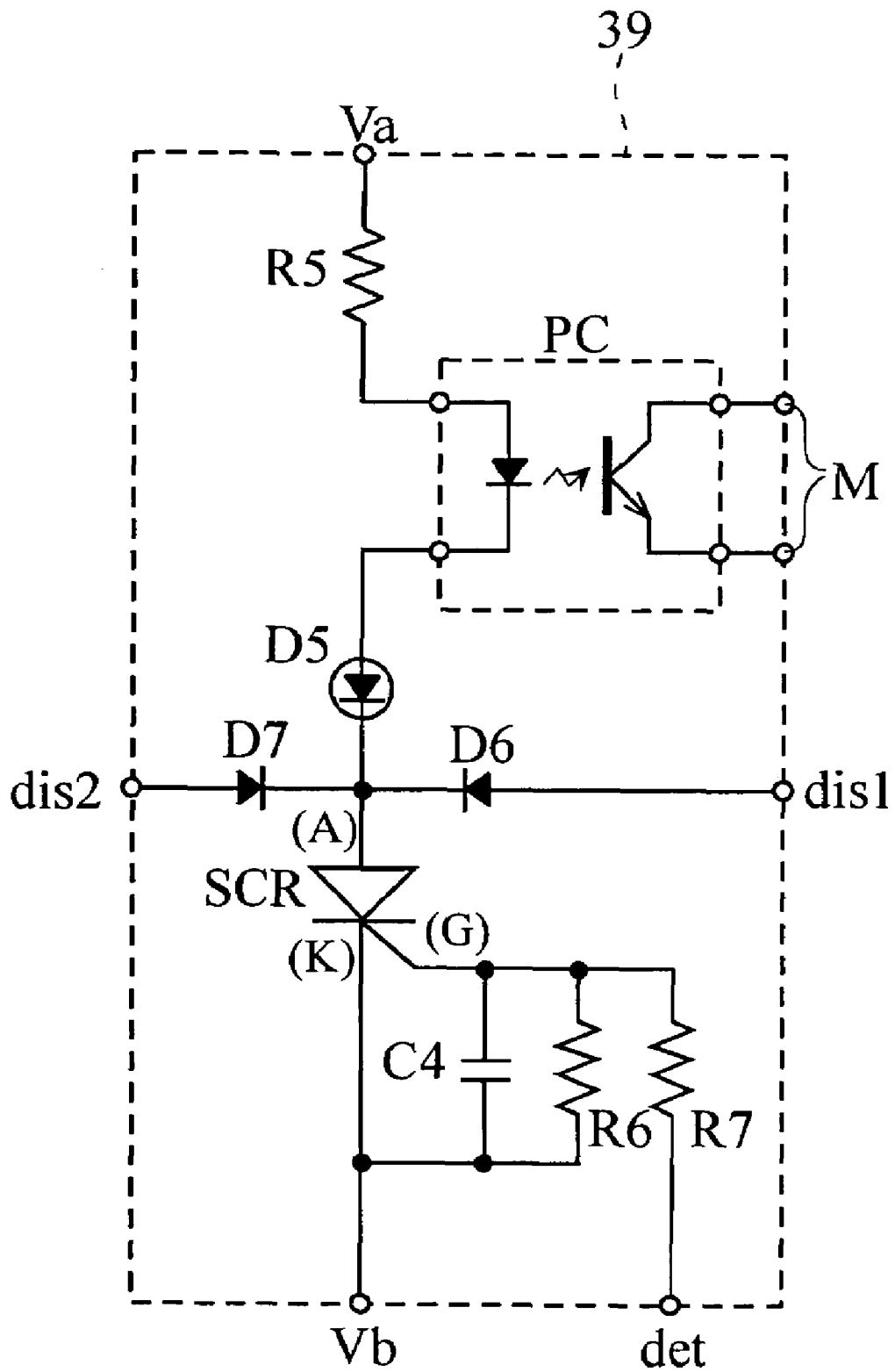
FIG. 15 shows a detailed circuit configuration of a protection circuit shown in FIG. 14.

The protection circuit 39 is provided generally between the output terminals Pa and Pb of the input-side rectifier circuit 2. Referring to FIG. 15, the protection circuit 39 includes a resistor R5 connected to a power supply terminal Va, which is connected to the output terminal Pa, a photocoupler PC connected to the resistor R5, a light-emitting diode D5, a thyristor (e.g., a reverse blocking triode thyristor) SCR, and a trigger circuit formed by resistors R6 and R7 and a capacitor C4.

These elements are connected with one another as follows. The power supply terminal Va of the protection circuit 39 is connected to the output terminal Pa of the input-side rectifier circuit 2 (see FIG. 14), and the first end of the resistor R5 is connected to the power supply terminal Va. The resistor R5 is for limiting the current flowing through the thyristor SCR, and the resistor R5 has a predetermined resistance value such that when the thyristor SCR is turned ON, the ON state can be maintained.

The anode terminal of the photodiode of the photocoupler PC is connected to the second end of the resistor R5, and the cathode terminal of the photodiode is connected to the anode terminal of the light-emitting diode D5.

The photocoupler PC is connected to a microcomputer (not shown), for example, via a terminal M for notifying the microcomputer of the activation of the protection circuit 39 (i.e., the ON state of the thyristor SCR). Based on the output from the photocoupler PC, the microcomputer can, for example, block the commercial power supply (see the "input" in FIG. 14) being input to the switching power supply. The light-emitting diode D5 is for emitting light to externally indicate the activation of the protection circuit 39 when the thyristor SCR is turned ON (i.e., when there occurs a current flow greater than or equal to a predetermined level).

The cathode terminal of the light-emitting diode D5 is connected to the anode terminal (A) of the thyristor SCR. The thyristor SCR is turned ON when there is a trigger input to the gate terminal (G), and the ON state is maintained as long as there is a current flow greater than or equal to the holding current.

The cathode terminal of a reverse current-preventing diode D6 is connected to the anode terminal (A) of the thyristor SCR, and the gate terminal (G) of the second switching element SW2 is connected to the anode terminal of the reverse current-preventing diode D6 via an output terminal dis1 of the protection circuit 39 (see FIG. 14).

The cathode terminal of a reverse current-preventing diode D7 is connected to the anode terminal (A) of the thyristor SCR, and the input terminal dis2 of a startup circuit 3C is connected to the anode terminal of the reverse current-preventing diode D7 via the output terminal dis2 of the protection circuit 39 (see FIG. 14).

Figure 16:
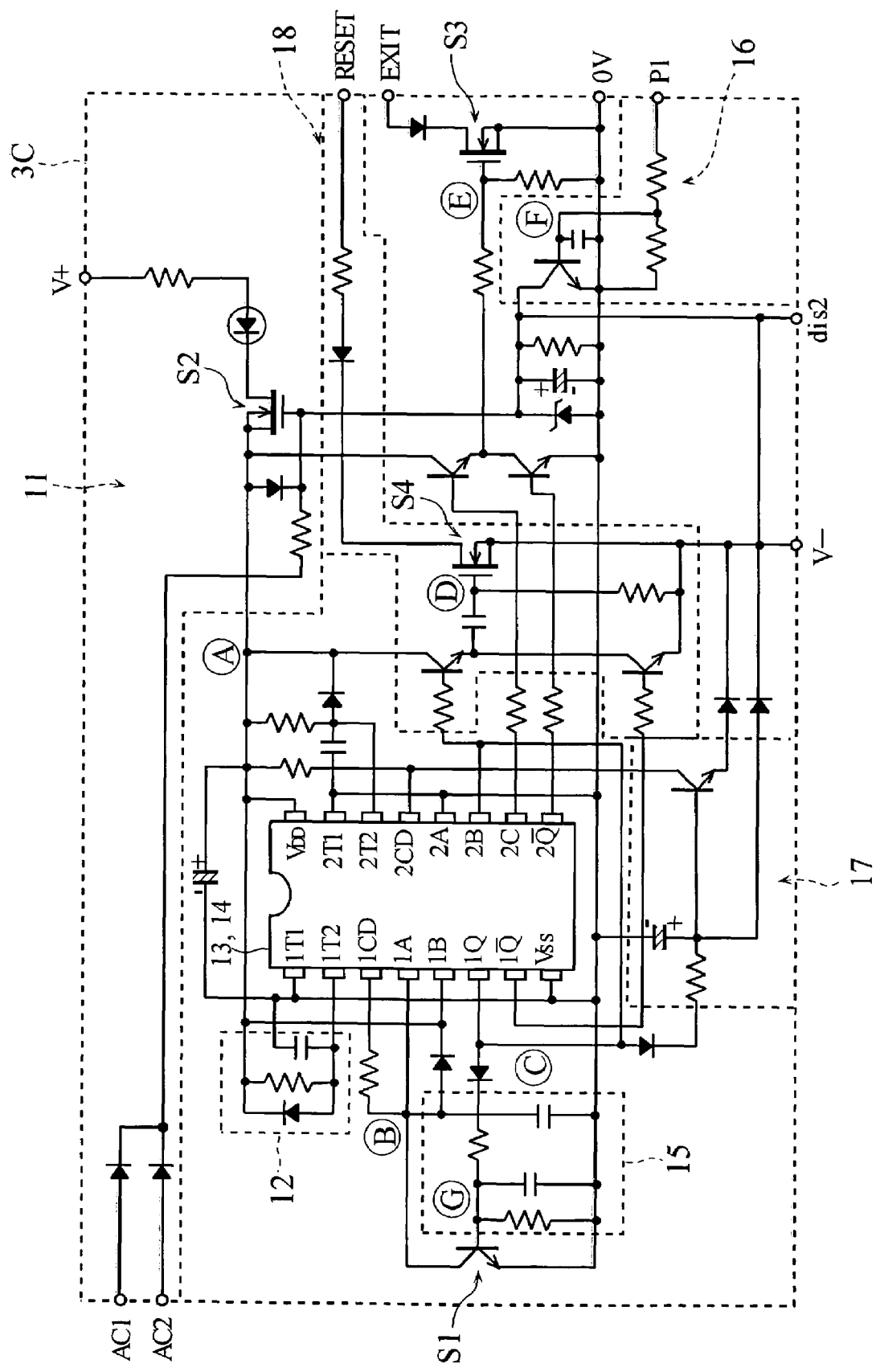
FIG. 16 shows a detailed circuit configuration of a startup circuit shown in FIG. 14.

In the circuit configuration of the startup circuit 3C of the fourth embodiment, the terminal dis2 is connected to the collector terminal of the transistor of the second delay circuit 16, as shown in FIG. 16. As will later be described in detail, the re-startup operation by the startup circuit 3C is prevented as a control signal is input from the protection circuit 39 to the terminal dis2. Other than this, the circuit configuration of the startup circuit 3C is similar to that of the startup circuit 3 shown in FIG. 9.

A parallel circuit of the bias resistor R6 and the bias capacitor C4 is connected between the gate terminal (G) and the cathode terminal (K) of the thyristor SCR. The first end of a resistor R7, serving as the trigger input for the thyristor SCR, is connected to the gate terminal (G) of the thyristor SCR, and the first end of an overcurrent detection resistor R8 (see FIG. 14) to be described later is connected to the second end of the resistor R7 via a terminal det of the protection circuit 39. The cathode terminal (K) of the thyristor SCR is connected to the second end of the overcurrent detection resistor R8 via a terminal Vb of the protection circuit 39. The overcurrent detection resistor R8 is for detecting an overcurrent flowing through the first and second switching elements SW1 and SW2.

The first end of the overcurrent detection resistor R8 is the source terminal (S) of the second switching element SW2, and is connected to the control terminal S of the second oscillation controlling circuit 7. The second end of the overcurrent detection resistor R8 is the anode side of the electrolytic capacitor Cb, and is connected to the power supply terminal V− of the startup circuit 3C.

The operation of the circuit configuration will now be described.

While the first and second switching elements SW1 and SW2 is in a normal oscillating state, the protection circuit 39 having the above configuration is not operating, and the thyristor SCR is OFF. Therefore, the photocoupler PC and the light-emitting diode D5 are also OFF. If an overcurrent then flows through the first and second switching elements SW1 and SW2, the overcurrent also flows through the overcurrent detection resistor R8 connected to the source terminal (S) of the second switching element SW2, and a current-voltage conversion is done by the overcurrent detection resistor R8. The voltage drop is supplied to the gate terminal (G) of the thyristor SCR, and the thyristor SCR is turned ON when the voltage drop exceeds a predetermined voltage value.

As the thyristor SCR is turned ON, the photocoupler PC is turned ON, whereby an output signal is supplied to the microcomputer (not shown) and the light-emitting diode D5 is lit. As a current greater than or equal to the holding current is supplied to the thyristor SCR via the resistor R5, the thyristor SCR remains ON.

As the thyristor SCR is turned ON, the anode voltage of the thyristor SCR decreases to a value near the voltage value at the terminal Vb. As the anode voltage of the thyristor SCR decreases, the gate voltage of the second switching element SW2 (which is connected to the anode terminal (A) of the thyristor SCR via the reverse current-preventing diode D6 and the terminal dis1) also decreases, thereby turning OFF the second switching element SW2.

As the second switching element SW2 is turned OFF, the feedback loop, which is formed by the first switching element SW1, the second switching element SW2, the main winding Ta of the high-frequency transformer T and the first and second auxiliary windings Tb and Tc for feedback, is disrupted, thereby terminating the oscillating state of the first and second switching elements SW1 and SW2.

As the anode voltage of the thyristor SCR decreases, a low level signal is output to the terminal dis2 of the startup circuit 3C via the reverse current-preventing diode D7. Thus, the second switch S2 of the startup circuit 3C is turned OFF,. and the power supply from the power supply circuit 11 of the startup circuit 3C is terminated. Thus, power is no longer supplied to various circuits from the power supply circuit 11 of the startup circuit 3C, thereby terminating the operation of the startup circuit 3C.

In the embodiments above, the startup circuit 3 starts a re-startup operation always when the first and second switching elements SW1 and SW2 are not in an oscillating state. In contrast, in the fourth embodiment, the startup circuit 3C does not perform the re-startup operation when the oscillating state of the first and second switching elements SW1 and SW2 is terminated by the activation of the protection circuit 39.

The ON state of the thyristor SCR is maintained until the current flowing through the thyristor SCR becomes less than or equal to the holding current. As the thyristor SCR is turned ON, the microcomputer (not shown) receives the output of the photocoupler PC, and the input commercial power supply is blocked by the microcomputer. Thus, the commercial power supply is no longer supplied to the switching power supply, and a current is no longer flowing through the thyristor SCR (the current becomes less than or equal to the holding current), whereby the thyristor SCR is turned OFF.

The thyristor SCR maintains its ON state unless the input commercial power supply is blocked, i.e., unless the current flowing therethrough becomes less than or equal to the holding current, and therefore the first and second switching elements SW1 and SW2 will not oscillate and the startup circuit 3C will not perform the re-startup operation.

Thus, in the fourth embodiment, with the provision of the protection circuit 39 and the overcurrent detection resistor R8, an overcurrent flowing through the circuit can be detected, and the oscillating state of the first and second switching elements SW1 and SW2 can be terminated and the re-startup operation by the startup circuit 3C can be prevented by means of the thyristor SCR.

A current is flowing through the thyristor SCR only when the protection circuit 39 is activated, and is not flowing therethrough during a normal, un-overloaded operation. Therefore, there is no increase in the power loss during a normal operation.

Figure 17:
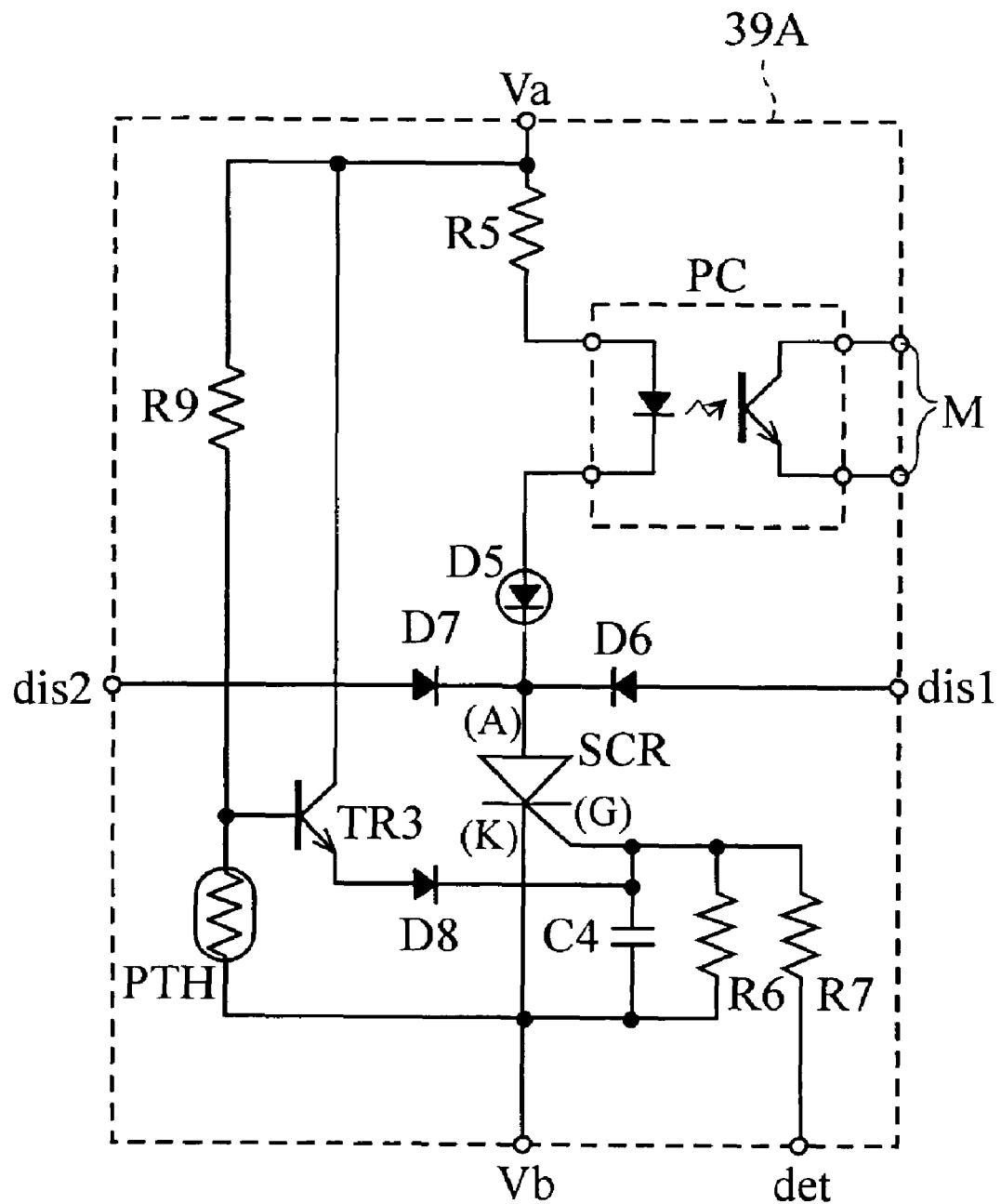
FIG. 17 shows an exemplary circuit configuration of a protection circuit using a positive temperature coefficient thermistor.

While the protection circuit 39 and the overcurrent detection resistor R8 are provided as a means for detecting an overcurrent in the circuit, there may be provided a means for detecting an excessive temperature increase in addition to the overcurrent detection means. Specifically, a protection circuit 39A may include a positive temperature coefficient thermistor PTH for detecting an excessive temperature increase as shown in FIG. 17, whereby it is possible to detect an excessive temperature increase while it is possible to detect an overcurrent by the overcurrent detection resistor R8, etc.

Specifically, in addition to the elements shown in FIG. 15, the protection circuit 39A further includes a resistor R9 and the positive temperature coefficient thermistor PTH, which are connected in series between the power supply terminals Va and Vb. The collector terminal of an NPN-type transistor TR3, which is turned ON when the positive temperature coefficient thermistor PTH detects an excessive temperature increase, is connected to the power supply terminal Va, and the base terminal of the transistor TR3 is connected to the middle point between the resistor R9 and the positive temperature coefficient thermistor PTH. The anode terminal of a diode D8 is connected to the emitter terminal of the transistor TR3, and the gate terminal (G) of the thyristor SCR is connected to the cathode terminal of the diode D8.

Although not shown, the positive temperature coefficient thermistor PTH is provided in an actual circuit, for example, by being thermally coupled to a heat-radiating heatsink in contact with the first and second switching elements SW1 and SW2, etc.

Figure 18:
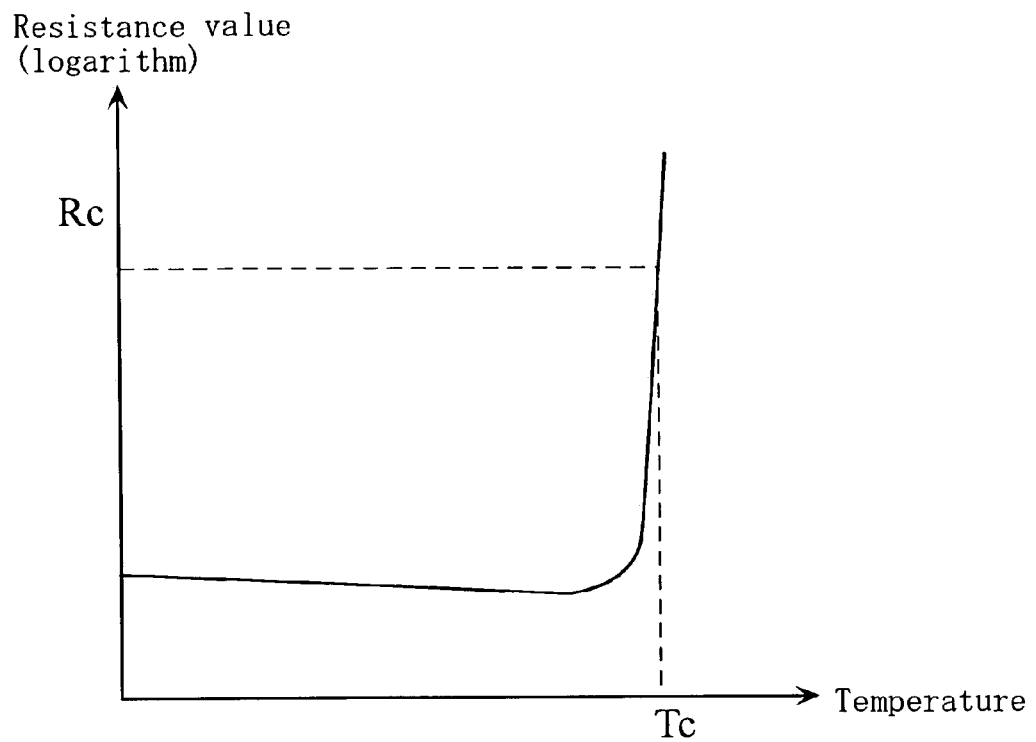
FIG. 18 shows resistance-temperature characteristics of a positive temperature coefficient thermistor.

As shown in FIG. 18, the positive temperature coefficient thermistor PTH is a device having resistance-temperature characteristics such that it shows a relatively low resistance value (e.g., some 10 ohms to some 100 ohms) when the ambient temperature is around room temperature, but shows an extremely high resistance value Rc (e.g.,.some 10 kilohms) when the ambient temperature comes close to a predetermined temperature Tc higher than room temperature.

With the above configuration, if the temperature of the circuit increases excessively, the resistance value of the positive temperature coefficient thermistor PTH increases, and the base voltage of the transistor TR3 exceeds a predetermined threshold value, whereby the transistor TR3 is turned ON. The ON state of the transistor TR3 increases the voltage at the gate terminal (G) of the thyristor SCR via the diode D8, which triggers the thyristor SCR ON.

As the thyristor SCR is turned ON, the anode voltage of the thyristor SCR decreases, which decreases the gate voltage of the second switching element SW2 (see FIG. 14) via the reverse current-preventing diode D6, thereby terminating the oscillating state of the first and second switching elements SW1 and SW2. Moreover, a low level signal is output from the terminal dis2 of the startup circuit 3C via the reverse current-preventing diode D7, thereby stopping re-startup operation by the startup circuit 3C (hereinafter the termination of the oscillating state of the first and second switching elements SW1 and SW2 and the termination of the re-startup operation by the startup circuit 3C will be referred to collectively as a "protection operation"). Thus, even if there is an excessive temperature increase in the circuit, the protection circuit 39A can detect the excessive temperature increase to perform a protection operation.

Figure 19:
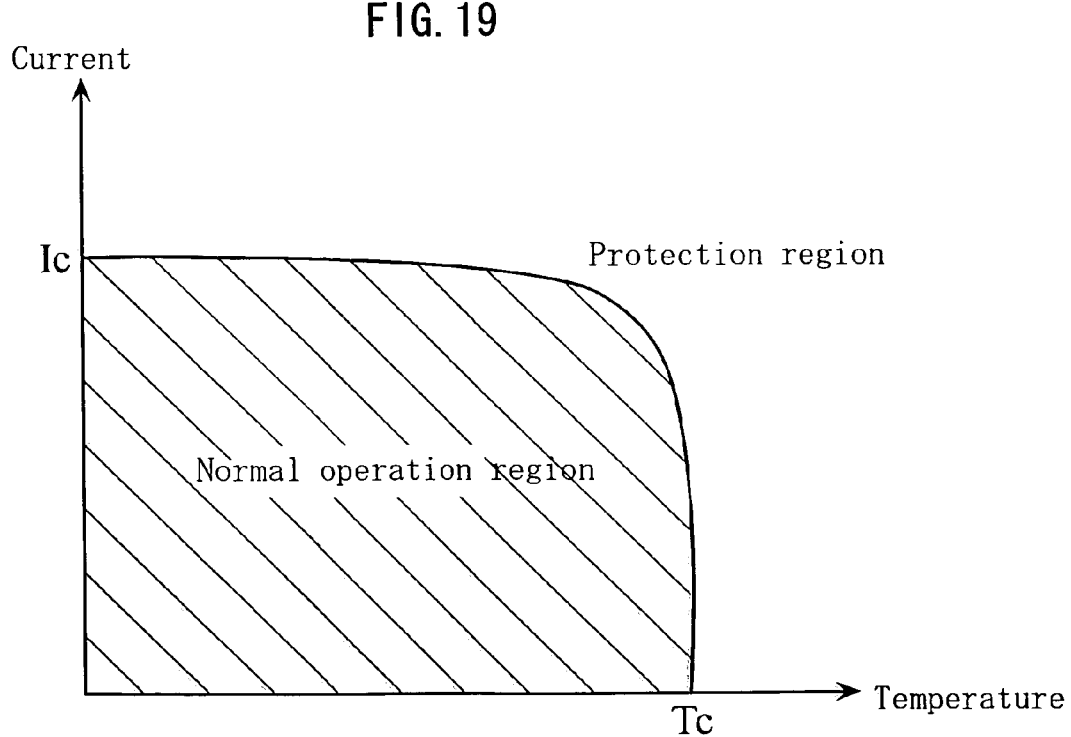
FIG. 19 shows a protection region of the protection circuit shown in FIG. 17, with respect to the temperature and the current.

Although the temperature detection circuit based on the positive temperature coefficient thermistor PTH is described herein as an addition to the overcurrent detection circuit for detecting an overcurrent, these circuits operate independently. Referring to FIG. 19, if an overcurrent greater than or equal to a generally constant current Ic flows at room temperature, the overcurrent detection circuit detects the presence of the overcurrent and performs a protection operation. If there is an excessive temperature increase exceeding the predetermined temperature Tc in the absence of an overcurrent, the temperature detection circuit detects the excessive temperature increase and performs a protection operation, irrespective of the current flowing through the second switching element SW2, etc.

Figure 20:
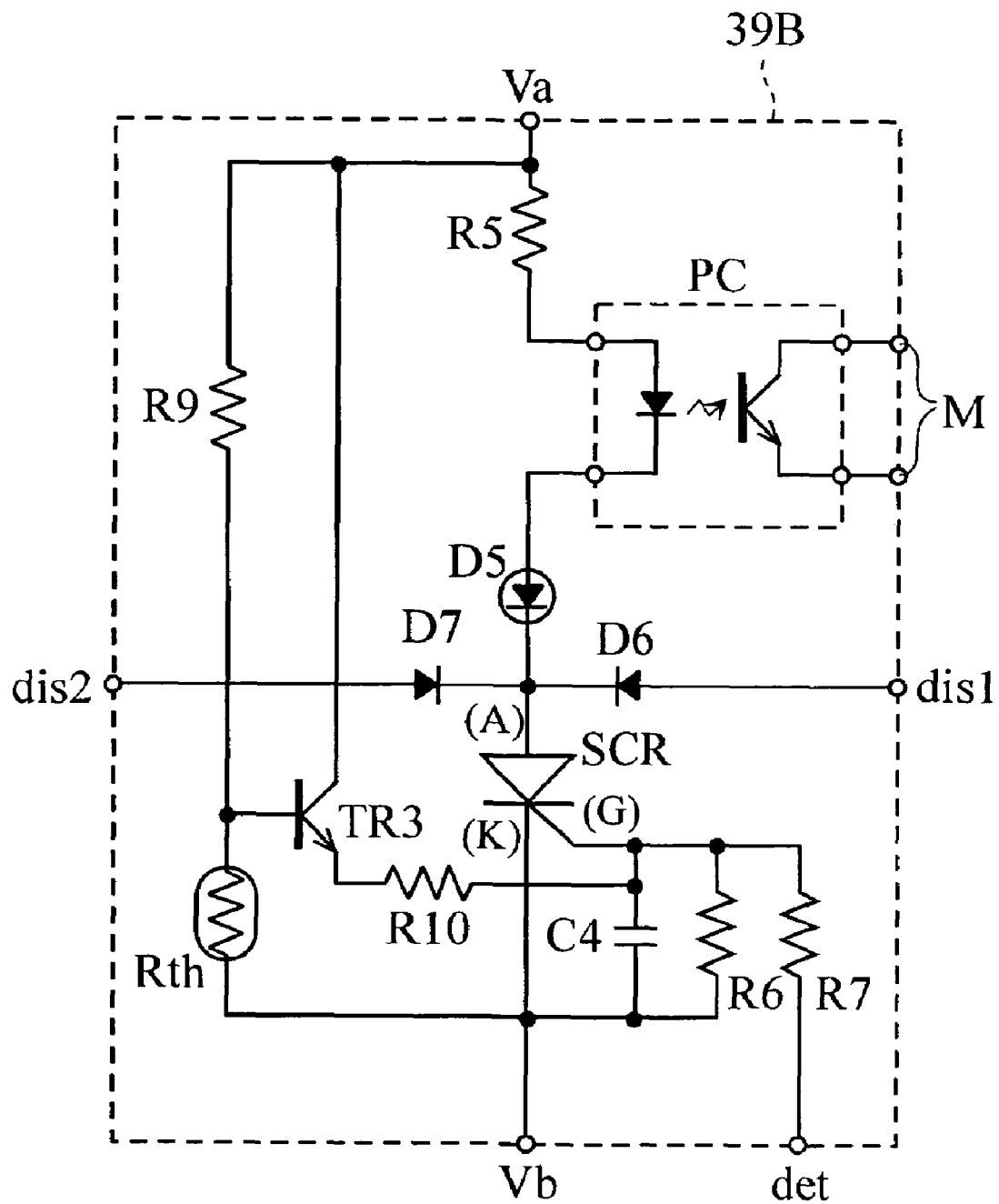
FIG. 20 shows an exemplary circuit configuration of a protection circuit using a heat-sensitive resistor.

Instead of the positive temperature coefficient thermistor PTH shown in FIG. 17, a protection circuit 39B using a heat-sensitive resistor Rth as shown in FIG. 20 may be employed. In the protection circuit 39B, a resistor R10 is used, instead of the diode D8 shown in FIG. 17, and the resistor R10 is connected to the gate terminal (G) of the thyristor SCR to thereby form an adder circuit for realizing temperature derating characteristics to be described later.

Figure 21:
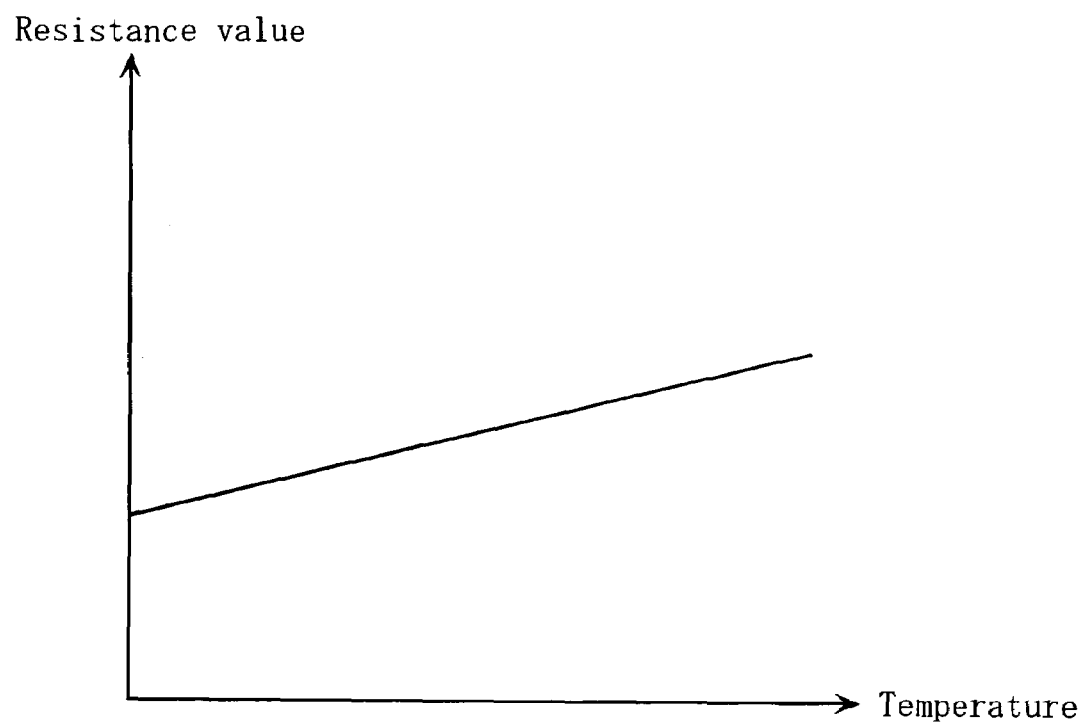
FIG. 21 shows resistance-temperature characteristics of a heat-sensitive resistor.
Figure 22:
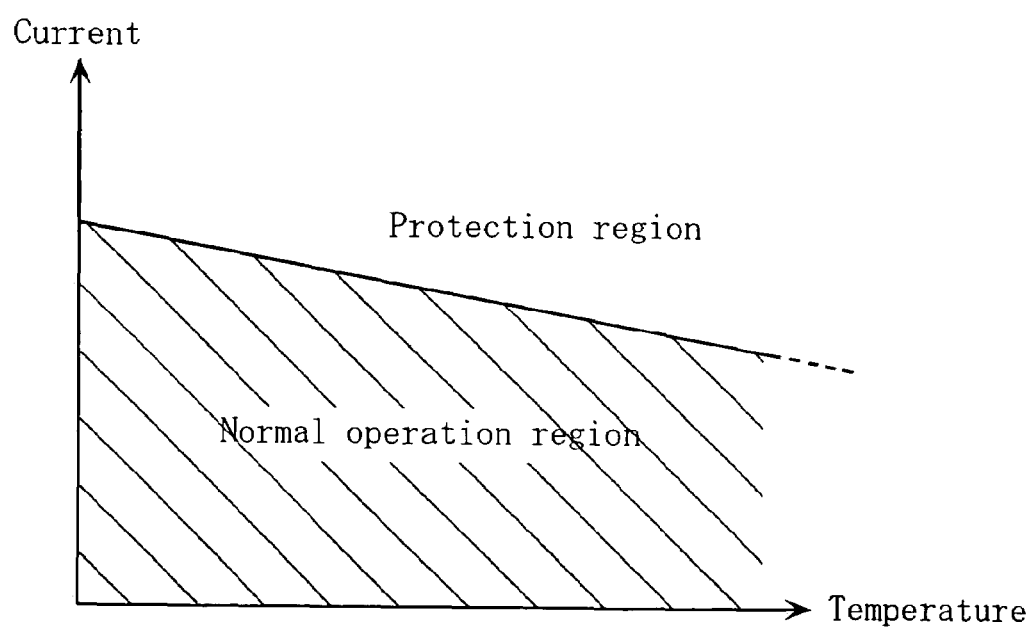
FIG. 22 shows a protection region of the protection circuit shown in FIG. 20, with respect to the temperature and the current.

The heat-sensitive resistor Rth is a resistive element using, for example, platinum, copper, nickel, or the like, and has a relatively linear, positive temperature-resistance characteristics as shown in FIG. 21. With the protection circuit 39B using the heat-sensitive resistor Rth, the threshold current value for the transition to the protection operation is lower as the temperature is higher, as shown in FIG. 22, thus realizing temperature derating characteristics such that the stress on circuit components, etc., is reduced as the temperature increases.

Figure 23:
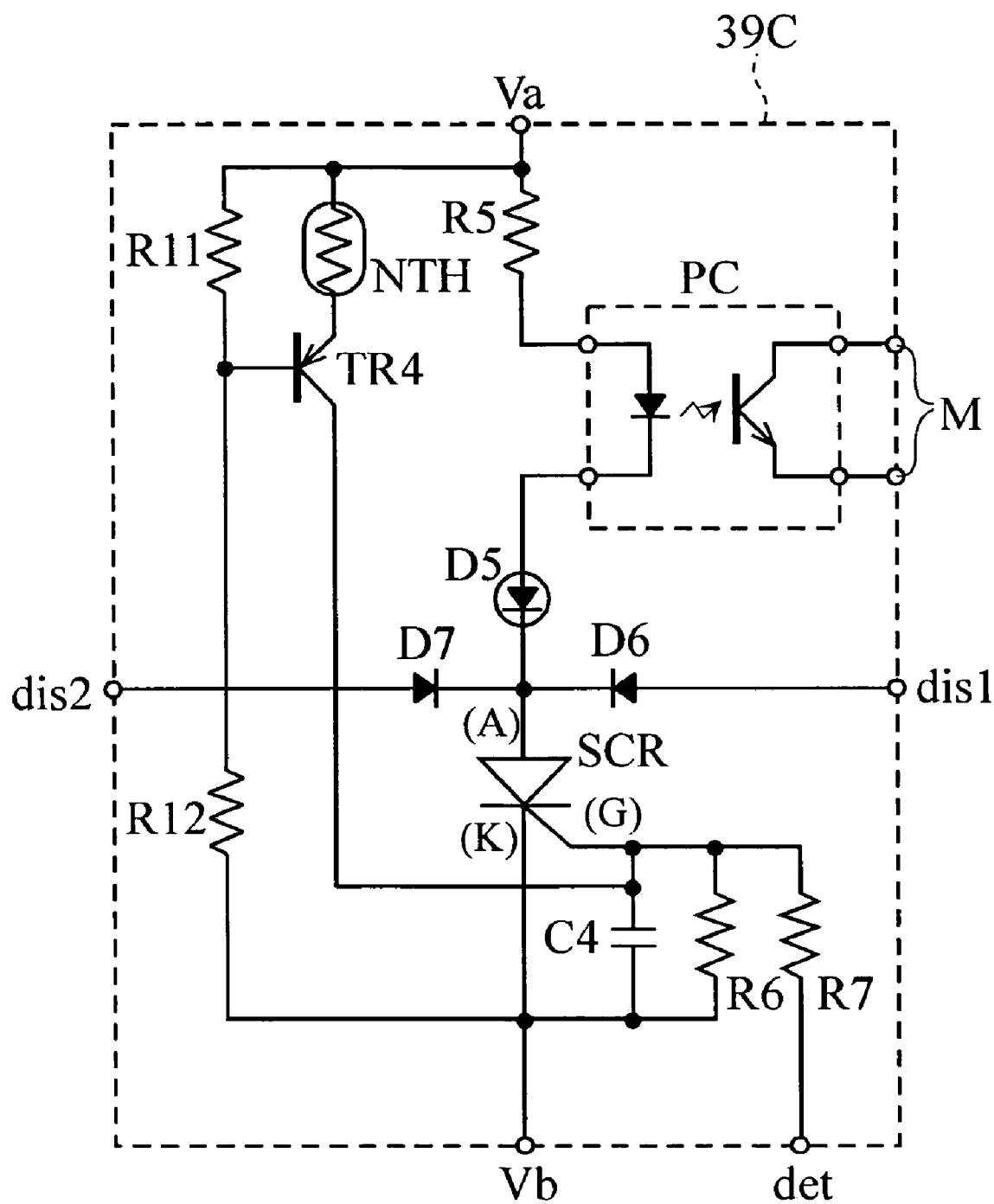
FIG. 23 shows an exemplary circuit configuration of a protection circuit using a negative temperature coefficient thermistor.

Instead of the positive temperature coefficient thermistor PTH shown in FIG. 17, a protection circuit 39C using a negative temperature coefficient thermistor NTH as shown in FIG. 23 may be employed.

Specifically, in addition to the configuration of the overcurrent detection circuit shown in FIG. 15, the protection circuit 39C further includes resistors R1 and R12 connected in series between the power supply terminals Va and Vb. The negative temperature coefficient thermistor NTH is connected to the power supply terminal Va, the emitter terminal of a PNP-type transistor TR4 is connected to the negative temperature coefficient thermistor NTH, and the base terminal of the transistor TR4 is connected to the middle point between the resistors R11 and R12. The gate terminal (G) of the thyristor SCR is connected to the collector terminal of the transistor TR4.

Figure 24:
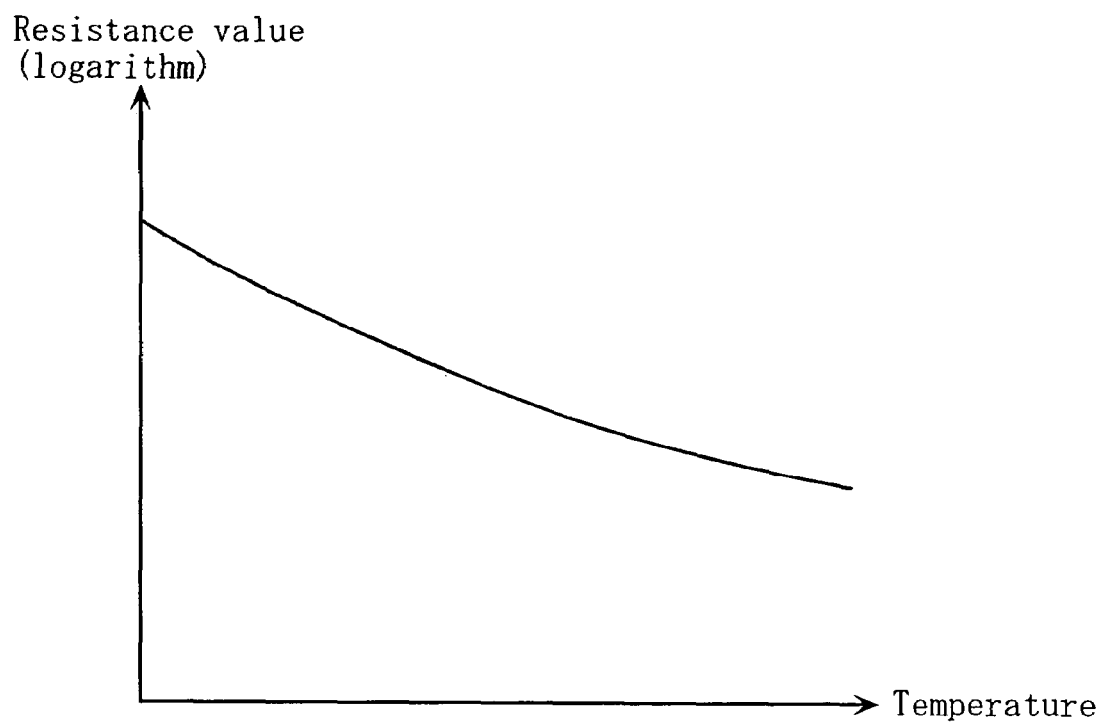
FIG. 24 shows resistance-temperature characteristics of a negative temperature coefficient thermistor.

As shown in FIG. 24, the negative temperature coefficient thermistor NTH is a device having resistance-temperature characteristics such that it shows a relatively high resistance value when the ambient temperature is around room temperature, but shows an exponentially lower resistance value as the ambient temperature is higher.

Figure 25:
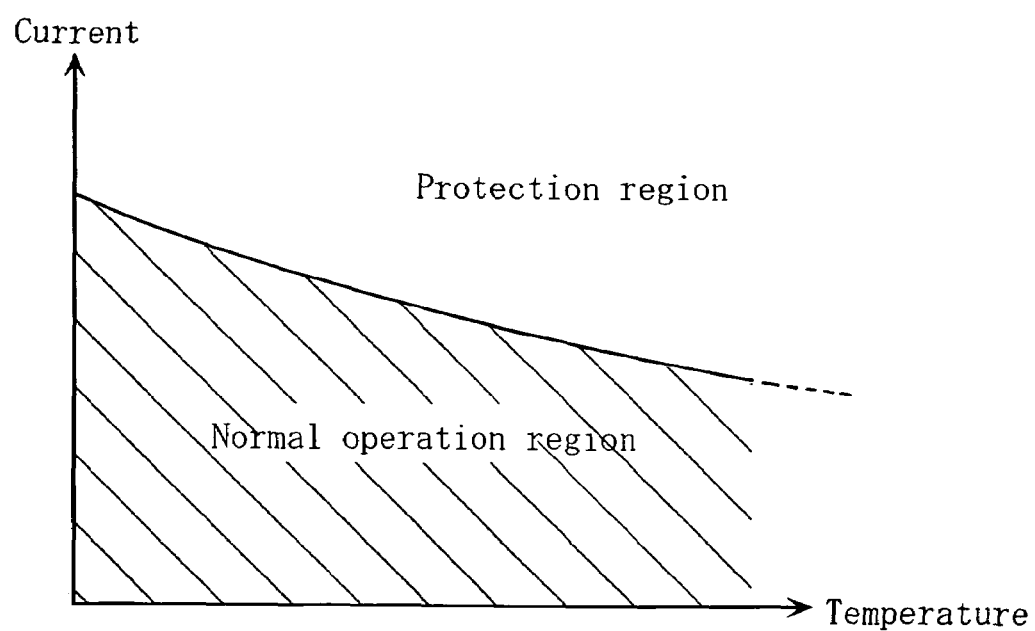
FIG. 25 shows a protection region of the protection circuit shown in FIG. 23, with respect to the temperature and the current.

With the above configuration, the negative temperature coefficient thermistor NTH has a high resistance at room temperature and therefore a relatively low current flows through the transistor TR4, and there is a small increase in the gate voltage of the thyristor SCR by the current flow. As the temperature increases, the resistance value of the negative temperature coefficient thermistor NTH decreases, thereby increasing the current flow through the transistor TR4 and increasing the gate voltage of the thyristor SCR. Thus, the threshold for the overcurrent detection decreases, thereby achieving derating characteristics such that the overcurrent protection threshold decreases as the temperature increases (see FIG. 25).

Figure 26:
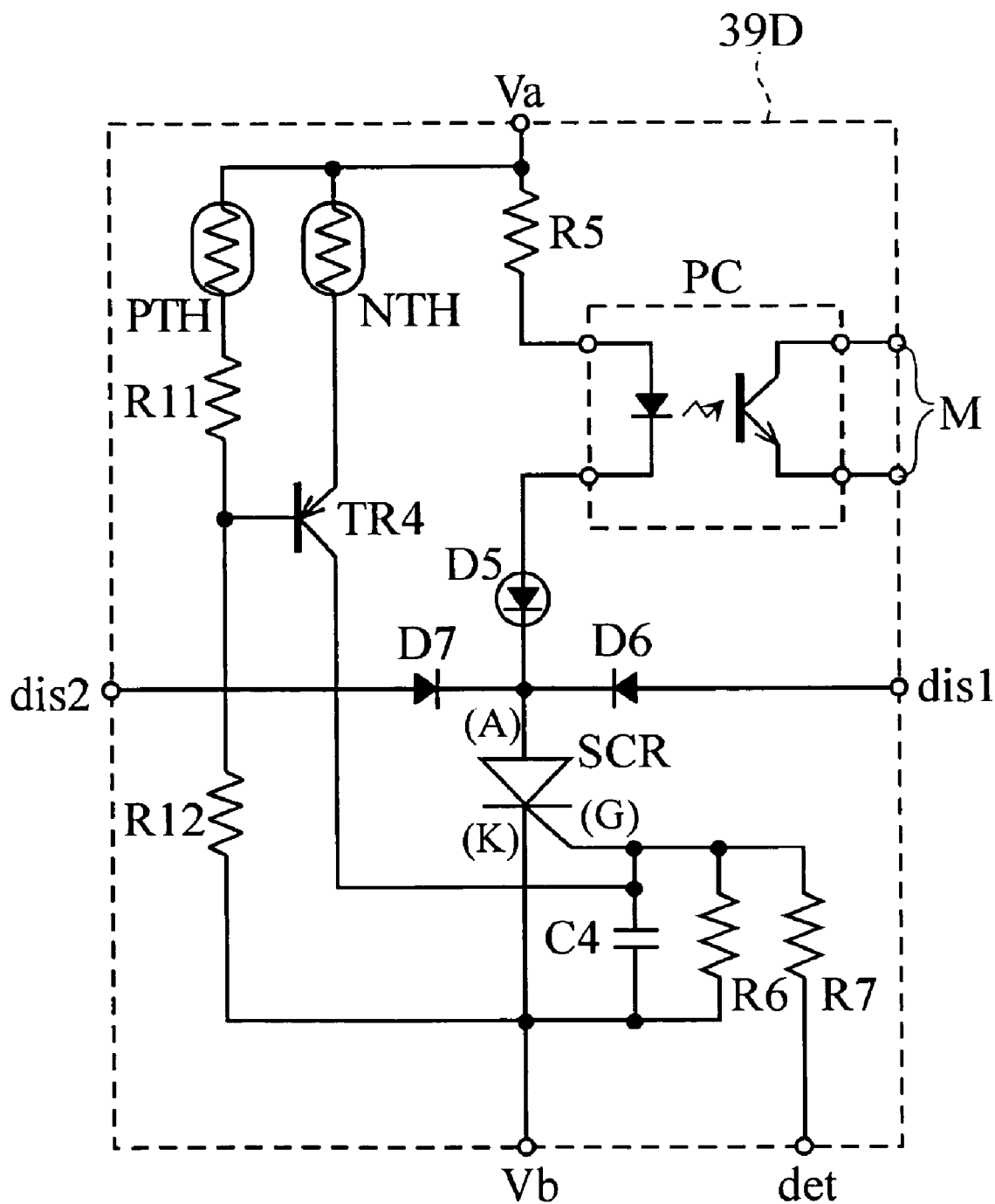
FIG. 26 shows an exemplary circuit configuration of a protection circuit using a positive temperature coefficient thermistor and a negative temperature coefficient thermistor.

A protection circuit 39D using both the negative temperature coefficient thermistor NTH and the positive temperature coefficient thermistor PTH may be employed as shown in FIG. 26. In addition to the configuration of the protection circuit 39C having the negative temperature coefficient thermistor NTH shown in FIG. 23, the protection circuit 39D further includes the positive temperature coefficient thermistor PTH between the power supply terminal Va and a resistor R11.

Figure 27:
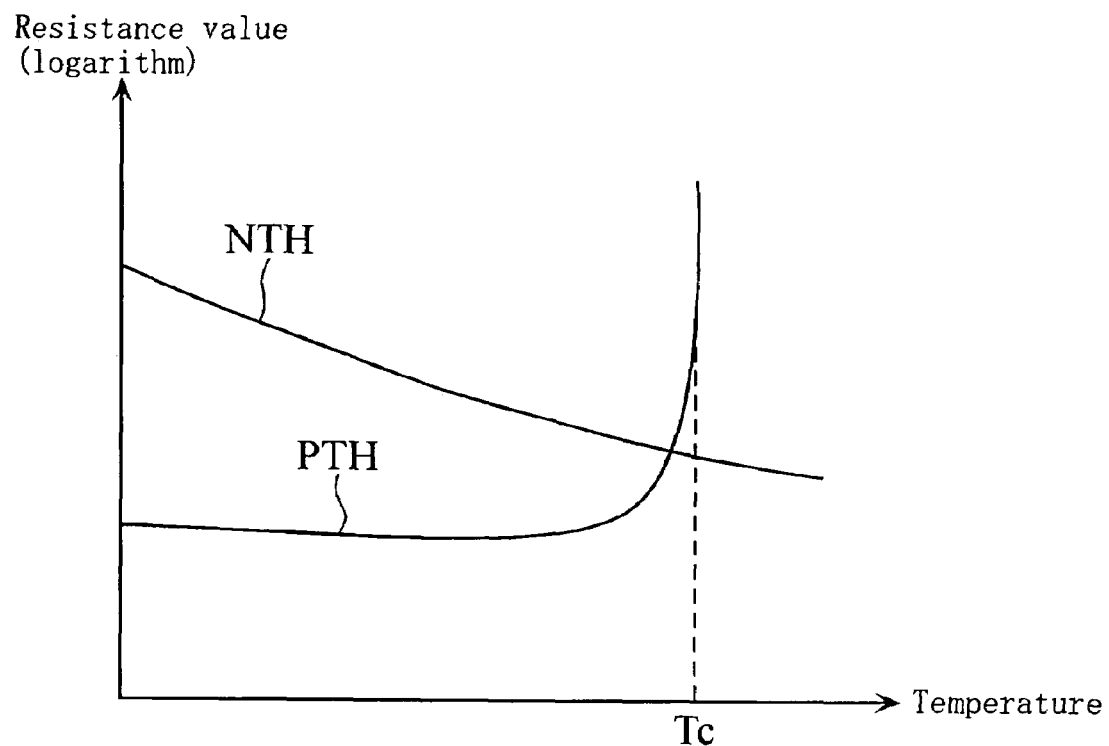
FIG. 27 shows resistance-temperature characteristics of a positive temperature coefficient thermistor and a negative temperature coefficient thermistor.
Figure 28:
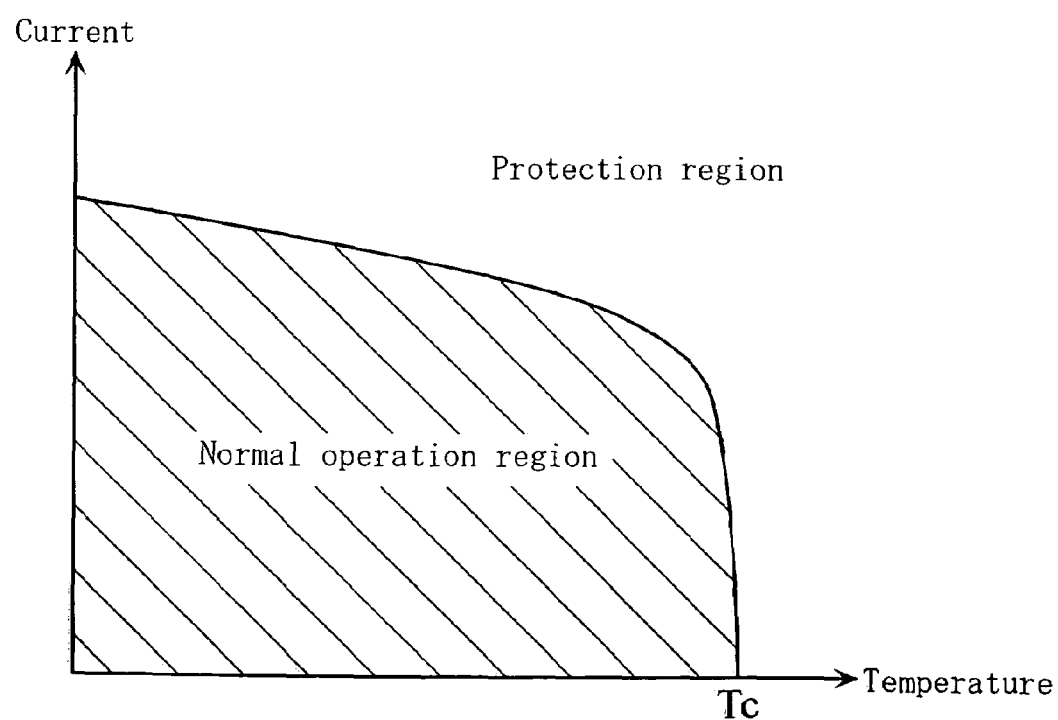
FIG. 28 shows a protection region of the protection circuit shown in FIG. 26, with respect to the temperature and the current.

As shown in FIG. 27, the negative temperature coefficient thermistor NTH and the positive temperature coefficient thermistor PTH both have temperature-resistance characteristics. Therefore, the protection circuit 39D exhibits temperature derating characteristics for an ambient temperature below a predetermined temperature Tc while performing the protection operation, irrespective of the current flowing through the second switching element SW2, etc., for an ambient temperature greater than or equal to the predetermined temperature Tc, as shown in FIG. 28.

It is understood that the scope of the present invention is not limited to the embodiments set forth herein. For example, while a half-bridge power supply circuit is used in the switching power supplies of the above embodiments, the configurations of the startup circuits 3, 3A, 3B and 3C can also be used for a push-pull type switching power supply.

What is claimed is:

1. A self-excited switching power supply circuit, comprising:
    a transformer including a main winding and an auxiliary winding, which are magnetically coupled together on a primary winding side;
    a switching element for intermittently supplying a direct-current voltage to the main winding; and
    a controller for turning ON/OFF the switching element using a voltage induced across the auxiliary winding by the intermittent supply of the direct-current voltage,
    wherein the switching power supply circuit includes a startup circuit, the startup circuit including:
    a startup switch connected to the main winding; and
    a driving pulse generator for outputting a driving pulse to the startup switch for turning ON the startup switch,
    wherein as the startup switch is turned ON by the driving pulse output from the driving pulse generator, a current flows through the main winding connected to the startup switch, thereby generating an induced voltage across the auxiliary winding, which turns ON/OFF the switching element.

2. The switching power supply circuit according to claim 1, wherein the startup circuit further includes:

an operation detector for detecting whether or not the ON/OFF switching operation of the switching element has started; and an output controller for, when the start of the ON/OFF switching operation of the switching element is not detected by the operation detector within a first predetermined period, outputting a driving pulse to the driving pulse generator for turning ON the startup switch again.

3. The switching power supply circuit according to claim 2, wherein:

the driving pulse generator includes a first pulse generating section for generating a reference pulse, and a second pulse generating section for generating the driving pulse based on the reference pulse generated from the first pulse generating section; and the output controller includes a switch section turned ON/OFF to thereby control whether or not to generate the reference pulse form the first pulse generating section, a delay circuit section for delaying the reference pulse generated from the first pulse generating section to turn OFF the switch section at delayed timing, thereby allowing the first pulse generating section to generate a next reference pulse.

4. The switching power supply circuit according to claim 1, wherein the startup circuit further includes:

a power supply providing section for providing a power supply to the startup circuit; and a supply stopping section for, when the start of the ON/OFF switching operation of the switching element is detected by the operation detector, stopping the provision of the power supply from the power supply providing section.

5. The switching power supply circuit according to claim 4, wherein:

the operation detector includes a determination section for rectifying and integrating a voltage induced across the auxiliary winding and detecting whether or not the integrated value exceeds a predetermined threshold value; and the supply stopping section includes a switch section that is turned OFF when it is determined by the determination section that the integrated value exceeds the predetermined threshold value, thereby stopping the provision of the power supply form the power supply providing section.

6. The switching power supply circuit according to claim 2, wherein the startup circuit further includes an operation controller for terminating an operation of the driving pulse generator when the start of the ON/OFF switching operation of the switching element is not detected by the operation detector within a second predetermined period, which is longer than the first predetermined period.

7. The switching power supply circuit according to claim 1, wherein where the controller is a saturable reactor, the startup circuit further includes a reset section for outputting a reset signal for resetting a residual magnetic flux of the saturable reactor.

8. The switching power supply circuit according to claim 3, wherein a cycle by which the reference pulse is generated from the first pulse generating section is longer than the first predetermined period.

9. The switching power supply circuit according to claim 1, wherein a pulse width of the driving pulse is shorter than an ON/OFF cycle of the switching element.

10. The switching power supply circuit according to claim 1, further including a protection circuit, the protection circuit including:

an overcurrent detector for detecting a flow of an overcurrent in the circuit; and an oscillation stopping section for stopping the ON/OFF switching operation of the switching element based of a detection result form the overcurrent detector.

11. The switching power supply circuit according to claim 10, wherein the protection circuit further includes and ON operation stopping section for preventing the output controller of the startup circuit from turning ON the startup switch again, based on a detection result from the overcurrent detector.

12. The switching power supply circuit according to claim 10, wherein:

the overcurrent detector includes a current detection resistor connected to the switching element, and a thyristor having a trigger input terminal connected to the current detection resistor, wherein after the thyristor is turned ON by a trigger input signal received through the trigger input terminal, the thyristor maintains the ON state; and the oscillation stopping section stops the ON/OFF switching operation of the switching element in response to the thyristor being turned ON.

13. The switching power supply circuit according to claim 11, wherein the ON operation stopping section prevents the output controller of the startup circuit from turning ON the startup switch again, in response to the thyristor being turned ON.

14. The switching power supply circuit according to claim 1, further including a protection circuit, the protection circuit including:

and overheat detector for detecting an excessive temperature increase in the circuit; and an oscillation stopping section for stopping the ON/OFF switching operation of the switching element base on a detection result form the overheat detector.

15. The switching power supply circuit according to claim 14, wherein the protection circuit further includes an ON operation stopping section for preventing the output controller of the startup circuit from turning ON the startup switch again, based on a detection result form the overheat detector.

16. The switching power supply circuit according to claim 14, wherein:

the overheat detector includes a temperature sensor for detecting a temperature, and a thyristor having a trigger input terminal indirectly connected to the temperature sensor, wherein after the thyristor is turned ON by a trigger input signal received through the trigger input terminal, the thyristor maintains the ON state; and the oscillation stopping section stops the ON/OFF switching operation of the switching element in response to the thyristor being turned ON.

17. The switching power supply circuit according to claim 15, wherein the ON operation stopping section prevents the output controller of the startup circuit form turning ON the startup switch again, in response to the thyristor being turned ON.

* * * * *